US012570321B2

(12) United States Patent
Yoshinaga

(10) Patent No.: US 12,570,321 B2
(45) Date of Patent: Mar. 10, 2026

(54) AUTONOMOUS DRIVING DEVICE, METHOD AND SYSTEM

(71) Applicant: DENSO CORPORATION, Kariya-city (JP)

(72) Inventor: Satoshi Yoshinaga, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 132 days.

(21) Appl. No.: 18/308,588

(22) Filed: Apr. 27, 2023

(65) Prior Publication Data

US 2023/0256998 A1 Aug. 17, 2023

Related U.S. Application Data

(63) Continuation of application No. PCT/JP2021/028951, filed on Aug. 4, 2021.

(30) Foreign Application Priority Data

Oct. 28, 2020 (JP) ................................ 2020-180647

(51) Int. Cl.
| | |
|---|---|
| *B60W 60/00* | (2020.01) |
| *B60W 30/095* | (2012.01) |
| *G05D 1/221* | (2024.01) |

(52) U.S. Cl.
CPC .... *B60W 60/0015* (2020.02); *B60W 30/0956* (2013.01); *B60W 60/007* (2020.02); *G05D 1/221* (2024.01); *B60W 2556/10* (2020.02)

(58) Field of Classification Search
None
See application file for complete search history.

(56) References Cited

U.S. PATENT DOCUMENTS

| | | | | |
|---|---|---|---|---|
| 11,884,293 | B2 * | 1/2024 | Srinivasan | .......... B60W 60/001 |
| 2018/0329418 | A1 * | 11/2018 | Baalke | .................... G16Z 99/00 |
| 2019/0107841 | A1 * | 4/2019 | Sasajima | ............. G05D 1/0221 |
| 2019/0137999 | A1 | 5/2019 | Taguchi et al. | |
| 2019/0163176 | A1 | 5/2019 | Wang et al. | |
| 2020/0409368 | A1 * | 12/2020 | Caldwell | ............. G05D 1/0044 |
| 2021/0325871 | A1 | 10/2021 | Taguchi et al. | |
| 2022/0113737 | A1 * | 4/2022 | Kobayashi | .......... G05D 1/0011 |
| 2023/0042706 | A1 | 2/2023 | Taguchi et al. | |

FOREIGN PATENT DOCUMENTS

| | | |
|---|---|---|
| JP | 2019-185280 A | 10/2019 |
| JP | 2019-185293 A | 10/2019 |
| JP | 2020-159844 A | 10/2020 |

* cited by examiner

*Primary Examiner* — Vivek D Koppikar
*Assistant Examiner* — David Ruben Pedersen
(74) *Attorney, Agent, or Firm* — Maschoff Brennan

(57) ABSTRACT

An autonomous driving method for causing a computer to perform a process of registering, for each point where remote assistance has been performed in the past for any one of autonomous driving vehicles, point information indicating a location of the point, and at least an extent of influence defined by a distance from the location of the point, and a process of, upon occurrence of a request for remote assistance from any one of the autonomous driving vehicles within the extent of influence included in the registered point information, temporarily withholding execution of remote assistance and causing the autonomous driving vehicle to perform autonomous driving.

14 Claims, 22 Drawing Sheets

| VEHICLE ID | DATE AND TIME | LOCATION | VEHICLE SPEED | AZIMUTH ANGLE | ... |
|---|---|---|---|---|---|
| 001 | YYYYMMDD hh:mm:00 | (x11, y11) | 60 k/m | 0° | |
| 001 | YYYYMMDD hh:mm:05 | (x12, y12) | 30 k/m | 10° | |
| ⋮ | | | | | |
| 002 | YYYYMMDD hh:mm:00 | (x21, y21) | 60 k/m | 0° | |
| ⋮ | | | | | |

Figure 8:
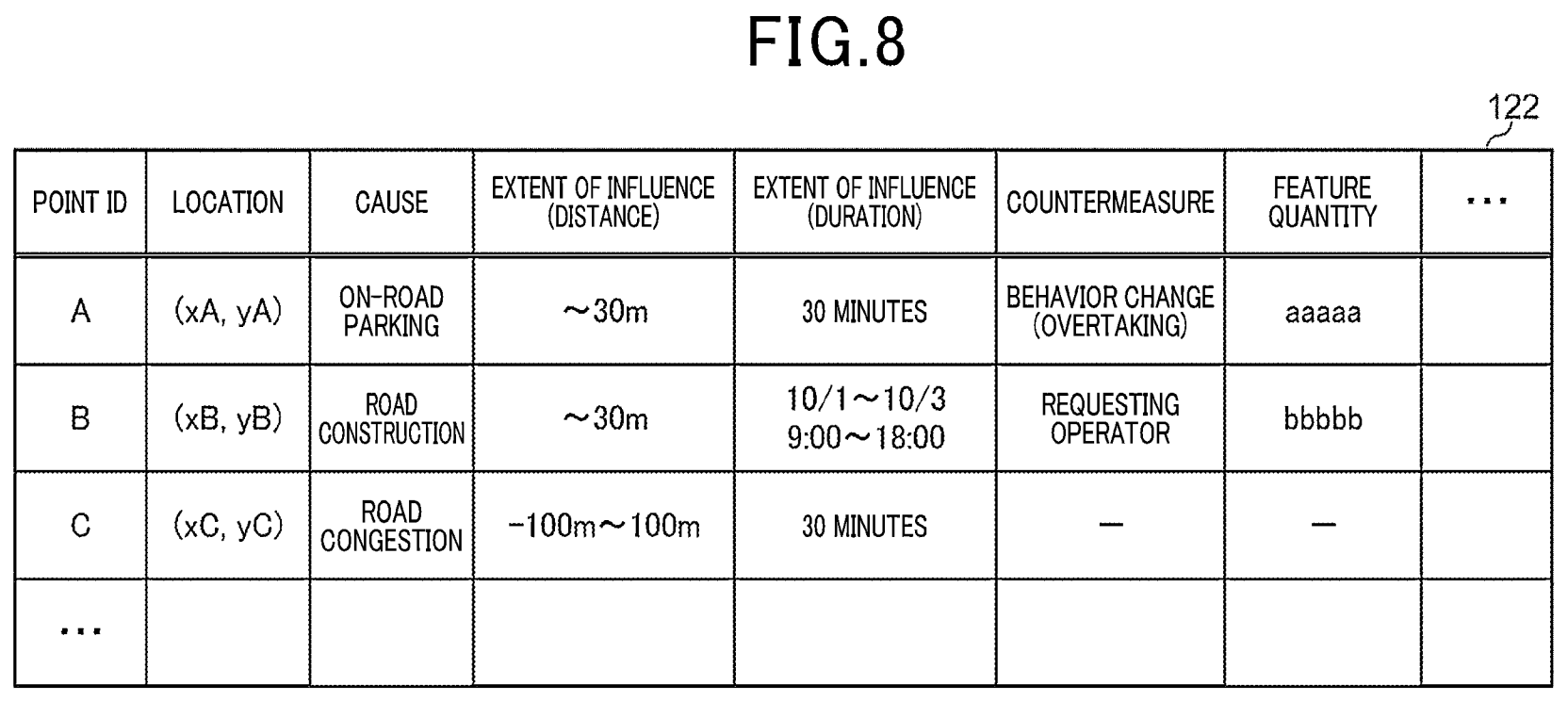

| POINT ID | LOCATION | CAUSE | EXTENT OF INFLUENCE (DISTANCE) | EXTENT OF INFLUENCE (DURATION) | COUNTERMEASURE | FEATURE QUANTITY | ... |
|---|---|---|---|---|---|---|---|
| A | (xA, yA) | ON-ROAD PARKING | ~30m | 30 MINUTES | BEHAVIOR CHANGE (OVERTAKING) | aaaaa | |
| B | (xB, yB) | ROAD CONSTRUCTION | ~30m | 10/1~10/3 9:00~18:00 | REQUESTING OPERATOR | bbbbb | |
| C | (xC, yC) | ROAD CONGESTION | -100m~100m | 30 MINUTES | — | — | |
| ... | | | | | | | |

| CAUSE | EXTENT OF INFLUENCE (DISTANCE) | EXTENT OF INFLUENCE (DURATION) |
|---|---|---|
| ROAD CONSTRUCTION | ~30m | ACQUISITION FROM CONSTRUCTION INFORMATION |
| ROAD CONGESTION | −100m~100m | 30 MINUTES |
| ON-ROAD PARKING | ~30m | 30 MINUTES |
| WAITING FOR TRAFFIC SIGNAL TO CHANGE | ~40m | 1.5 MINUTES |
| WAITING FOR BUS TO DEPART | ~20m | 2 MINUTES |
| . . . | | |

Figure 18:
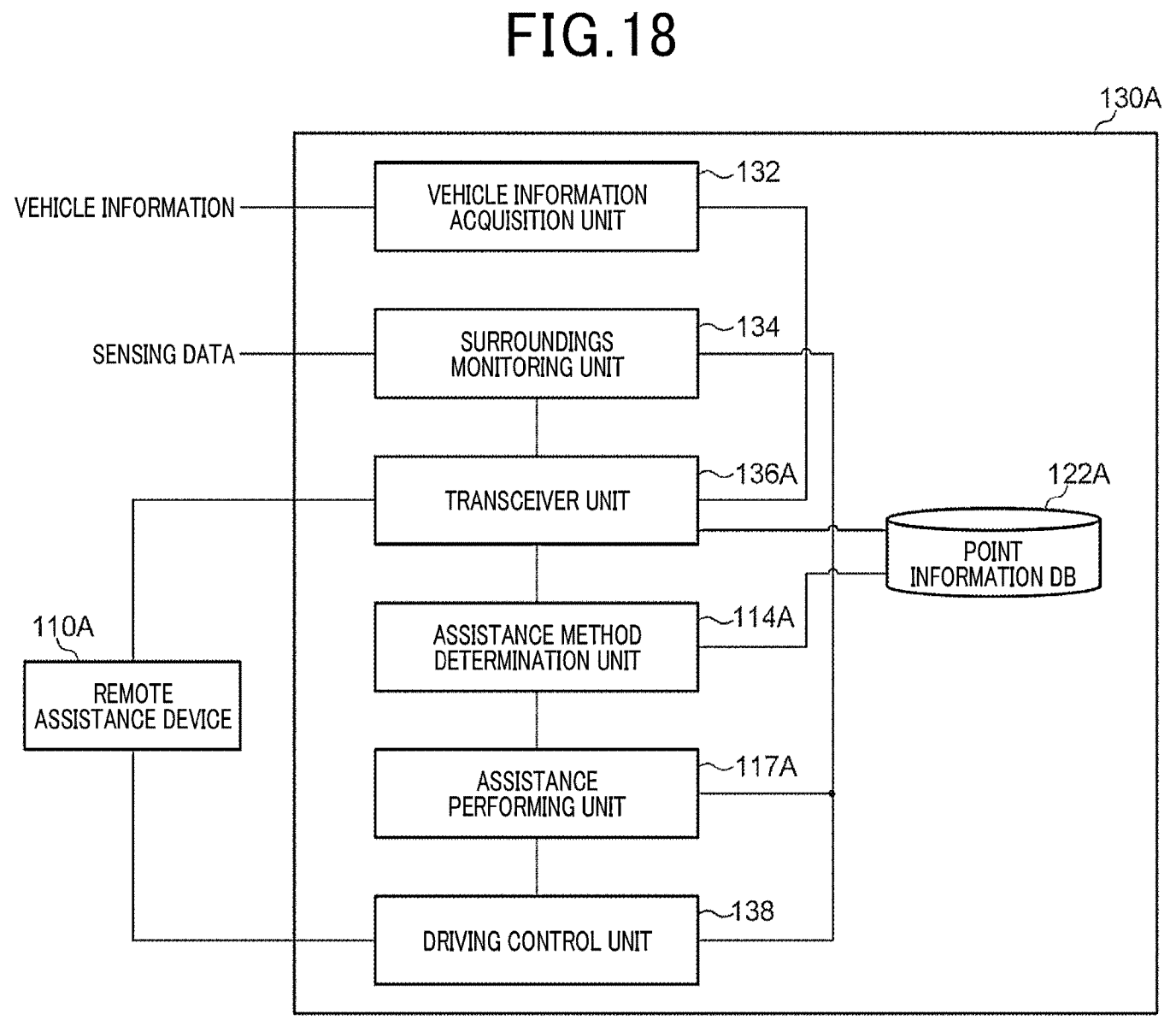

VEHICLE INFORMATION — VEHICLE INFORMATION ACQUISITION UNIT 132

SENSING DATA — SURROUNDINGS MONITORING UNIT 134

TRANSCEIVER UNIT 136A

POINT INFORMATION DB 122A

ASSISTANCE METHOD DETERMINATION UNIT 114A

ASSISTANCE PERFORMING UNIT 117A

DRIVING CONTROL UNIT 138

REMOTE ASSISTANCE DEVICE 110A

AUTONOMOUS DRIVING DEVICE, METHOD AND SYSTEM

CROSS-REFERENCE TO RELATED APPLICATION

This application is a continuation application of International Application No. PCT/JP2021/028951 filed Aug. 4, 2021 which designated the U.S. and claims priority to Japanese Patent Application No. 2020-180647 filed with the Japan Patent Office on Oct. 28, 2020, the contents of each of which are incorporated herein by reference.

BACKGROUND

Technical Field

The present disclosure relates to an autonomous driving device, method and system.

Related Art

Conventionally, there is a known remote monitoring technology for ensuring safety of autonomous driving vehicles during autonomous driving. In this known remote monitoring technology, each autonomous driving vehicle transmits camera-captured images of its surroundings captured by a camera to a remote monitoring center. Upon detecting an obstacle based on information acquired from autonomous sensors, including the camera, the autonomous driving vehicle automatically stops. When the autonomous driving vehicle automatically stops, the remote monitoring center determines whether the autonomous driving vehicle is allowed to resume travel based on the received camera-captured images. Upon the remote monitoring center determining that the autonomous driving vehicle is allowed to resume travel, the remote monitoring center transmits a start signal to the autonomous driving vehicle. Upon receipt of the start signal from the remote monitoring center, the autonomous driving vehicle resumes travel.

There is also a known control device for reducing the workload of an operator while maintaining safety. This known control device registers location information and sensing data as point data when remote control is performed, and records the point data in association with remote-control information. When the control device performs remote control for an autonomous driving vehicle, which is a subject vehicle, the control device compares the current point data acquired from the subject vehicle with the point data already registered in the control device to determine whether there is similar point data. In a case where there is similar registered point data to the current point data of the subject vehicle, the control device performs first remote control with no operator intervention. In a case where there is no similar registered point data to the current point data of the subject vehicle, the control device performs second remote control with operator intervention.

BRIEF DESCRIPTION OF THE DRAWINGS

In the accompanying drawings:

FIG. 3 is a schematic diagram of an autonomous driving system;

FIG. 7 is an illustration of an example of a vehicle information DB;

FIG. 8 is an illustration of an example of a point information DB;

FIG. 11 is an illustration of an example extent of influence DB;

FIG. 13 is an illustration of another example of how to determine an extent of influence;

FIG. 18 is a functional block diagram of an on-board device according to a modification to the first embodiment;

DESCRIPTION OF SPECIFIC EMBODIMENTS

Figure 1:
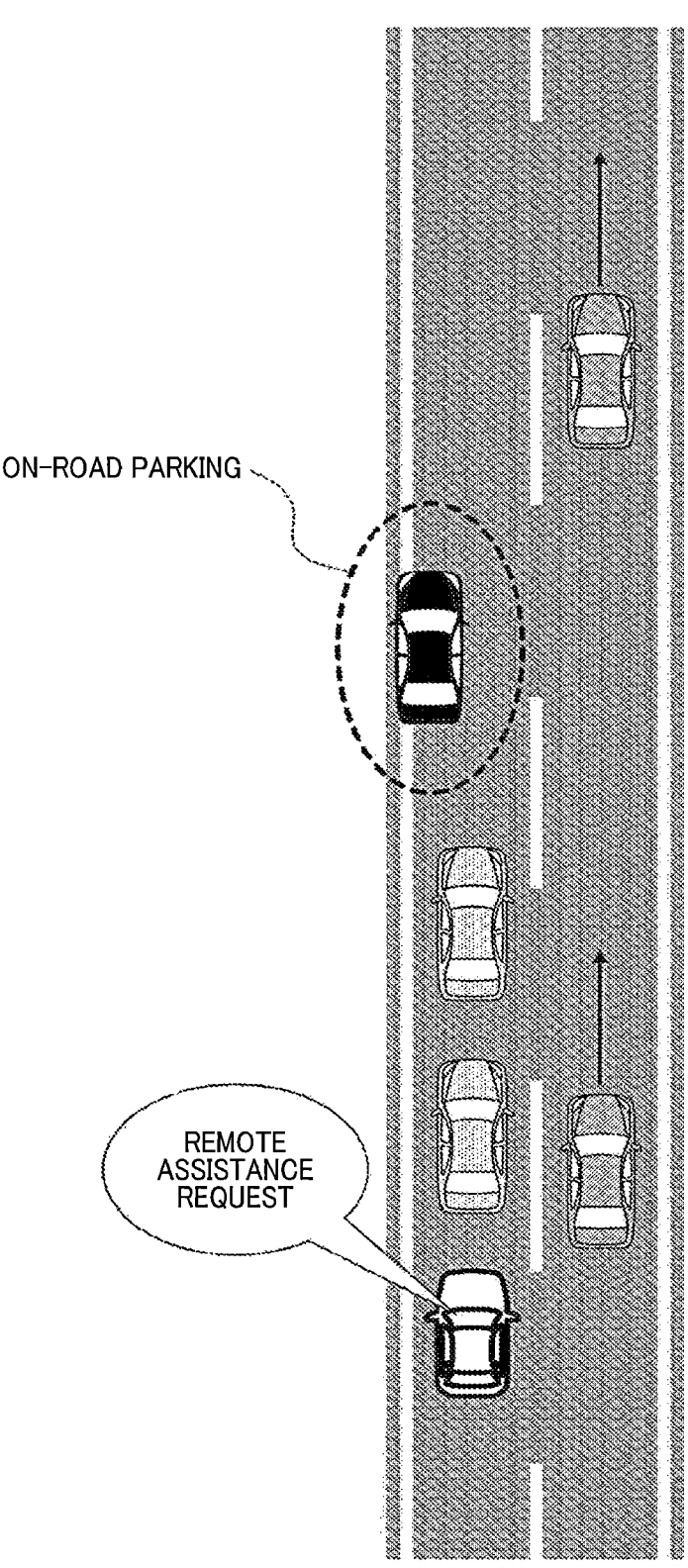
FIG. 1 is an illustration of an issue with performing remote assistance based on registered point information.

As a result of detailed research performed by the present inventors, regarding the remote monitoring technology as disclosed in JP 2019-87015 A, the following issue has been found. That is, since a monitor is requested each time an obstacle is detected and the autonomous vehicle automatically stops in response thereto, the monitor may be requested many times for the same reason. For example, in a case where road construction is ongoing on a roadway where an autonomous vehicle is traveling, a preceding vehicle that has stopped due to the road construction and a guide who prompts a vehicle to change lanes may each be detected as an obstacle, and the monitor may be requested each time any one of these obstacles is detected.

The following issue has also been found with the control device. That is, since the point information included in the point data is used to determine whether to perform remote control, it may not be possible to properly determine whether there is operator intervention, or when to request the operator in the presence of operator intervention. This may cause unnecessary requests for the operator.

In view of the above, it is desired to have a technology to suppress occurrence of unnecessary requests for operators and execution of inappropriate remote instructions in situations where remote driving assistance for autonomous driving vehicles is needed.

One aspect of the present disclosure provides an autonomous driving method for causing a computer to perform processes of: registering, for each point where remote assistance has been performed in the past for any one of autonomous driving vehicles, point information indicating a location of the point, and at least an extent of influence defined by a distance from the location of the point; and upon occurrence of a request for remote assistance from any one of the autonomous driving vehicles within the extent of influence included in the registered point information, withholding execution of remote assistance and causing the autonomous driving vehicle to perform autonomous driving.

One aspect of the present disclosure provides an autonomous driving device including: a registration unit configured to register, for each point where remote assistance has been performed in the past for any one of autonomous driving vehicles, point information indicating a location of the point, and at least an extent of influence defined by a distance from the location of the point; and a performing unit configured to, upon occurrence of a request for remote assistance from any one of the autonomous driving vehicles within the extent of influence included in the registered point information, temporarily withhold execution of remote assistance and cause the autonomous driving vehicle to perform autonomous driving.

One aspect of the present disclosure provides a non-transitory computer-readable medium comprising instructions for causing a computer to: register, for each point where remote assistance has been performed in the past for any one of autonomous driving vehicles, point information indicating a location of the point, and at least an extent of influence defined by a distance from the location of the point; and upon occurrence of a request for remote assistance from any one of the autonomous driving vehicles within the extent of influence included in the registered point information, temporarily withhold execution of remote assistance and cause the autonomous driving vehicle to perform autonomous driving.

One aspect of the present disclosure provides an autonomous driving system including an on-board device to be mounted to each of autonomous driving vehicles and configured to control autonomous driving of the corresponding autonomous driving vehicle; and a remote assistance device configured to perform remote assistance for autonomous driving of the autonomous driving vehicles. The remote assistance device includes a registration unit configured to register, for each point where remote assistance has been performed in the past for any one of the autonomous driving vehicles, point information indicating a location of the point, and at least an extent of influence defined by a distance from the location of the point. The remote assistance device or the on-board device comprises a performing unit configured to, upon occurrence of a request for remote assistance from any one of the autonomous driving vehicles within the extent of influence included in the registered point information, temporarily withhold execution of remote assistance and cause the autonomous driving vehicle to perform autonomous driving.

The autonomous driving method, device, storage medium, and system of the present disclosure can suppress occurrence of unnecessary requests for operators and execution of inappropriate remote instructions in situations where remote driving assistance for autonomous driving vehicles is needed.

First, before describing the details of each embodiment, the issue with the control device as disclosed in JP 2019-185280 A will be described in more detail, where point information about a point where remote assistance was performed and remote assistance is performed based on the registered point information.

The control device described in JP 2019-185280 A determines whether the point information of the subject vehicle is similar to the registered point information to determine the presence or absence of operator intervention. For example, it is determined whether a distance between locations included in the point information of the subject vehicle and in the registered point information is small. The stricter the criterion for determining the similarity of the point information, the higher the probability that there is no registered point information similar to the point information of the subject vehicle, leading to a higher probability of the operator being requested arising from a determination that the obstacle is unregistered.

A more specific example will now be described. Suppose, for example, that point information arising from on-road parking has been registered, as illustrated in FIG. 1. Assume that this point information includes location information of a vehicle parked on the road and remote-control information (without requesting an operator) for travel to avoid the vehicle parked on the road. In such a case, when traffic congestion, temporary stop, slow travel or the like (hereinafter referred to as traffic congestion or the like) is occurring due to such on-road parking, it is assumed that remote assistance will be requested by an autonomous driving vehicle when the traffic congestion or the like is detected by stopping or slowing down of the preceding vehicle. However, in the example illustrated in FIG. 1, since there is a gap between the location where remote assistance is requested and the location included in the registered point information, it is determined that the request is for remote assistance at a point where no point information has been registered, causing an operator to be requested.

Similarly, in the example illustrated in FIG. 1, with a looser criterion for determining the similarity of point information, the point information of the subject vehicle is determined to be similar to the registered point information, and autonomous driving of the subject vehicle is controlled based on the remote-control information included in this registered point information. In this case, an inappropriate remote instruction may be notified to the subject vehicle. For example, suppose that, as remote-control information, the subject vehicle is notified of a remote instruction to overtake a vehicle parked on the road. In this case, a preceding vehicle and the subject vehicle may start overtaking at the same time, which may cause inconvenience to other traffic participants.

Figure 2:
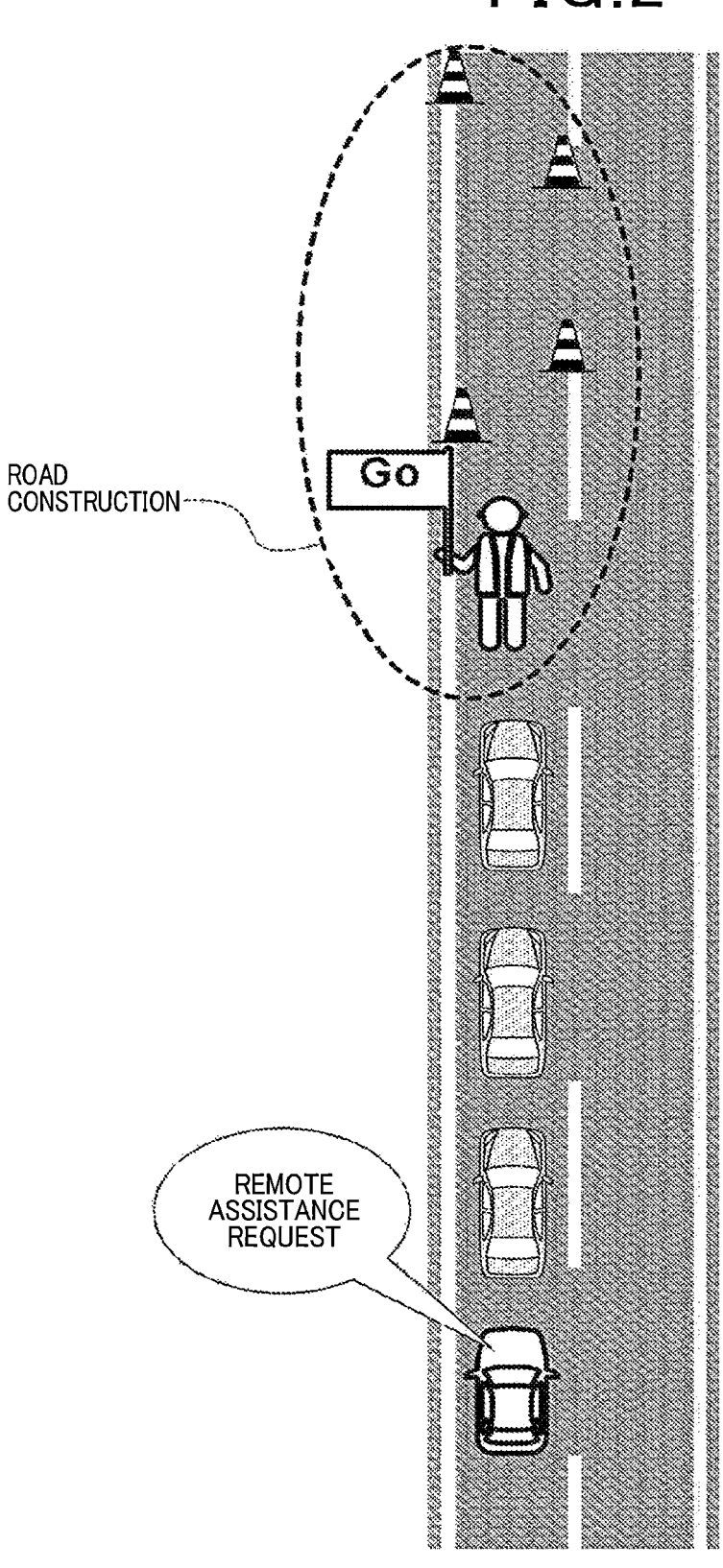
FIG. 2 is an illustration of an issue with performing remote assistance based on registered point information.

Suppose, for example, as illustrated in FIG. 2, that point information arising from road construction has been registered. Suppose that this point information includes information about a location where road construction is ongoing and information about remote assistance to request an operator. As to remote assistance in such a case, for example, the subject vehicle is remotely controlled to travel along a path that avoids the construction site when the operator checks camera-captured images of surroundings of the subject vehicle to recognize a flag of a guide at the road construction site, and detects a go-ahead signal. In this case, when traffic congestion or the like is occurring due to the road construction, it is assumed, as in the case of FIG. 1, that remote assistance will be requested from the autonomous driving vehicle upon the traffic congestion or the like being detected. With a stricter criterion for determining the similarity of point information, it is determined, as in the example illustrated in FIG. 1, that the request is for remote assistance at a point where no point information has been registered, and the operator will be requested. With a looser criterion for determining the similarity of point information, the operator will be requested at a stage when the guide is still too far. As a result, the operator who is requested must wait until the subject vehicle approaches the guide to provide remote assistance, which means that the operator is kept busy for a long period of time. In each of the following embodiments, an extent of influence (described in detail later) is registered previously in the point information. In a case where a remote assistance request from an autonomous driving vehicle is made within the extent of influence, it is determined that the remote assistance request has been caused by traffic congestion due to the original cause (e.g., on-road parking, road construction, etc.) that led to the registration of the point information. In this case, remote assistance, such as an instruction to change the behavior, such as overtaking or the like, or request an operator, is temporarily withheld in response to the remote assistance request. Remote assistance to the autonomous driving vehicle is provided at the timing when the vehicle reaches the point where remote assistance is originally needed.

Hereinafter, some embodiments of the disclosure will be described with reference to the accompanying drawings.

First Embodiment

Figure 3:
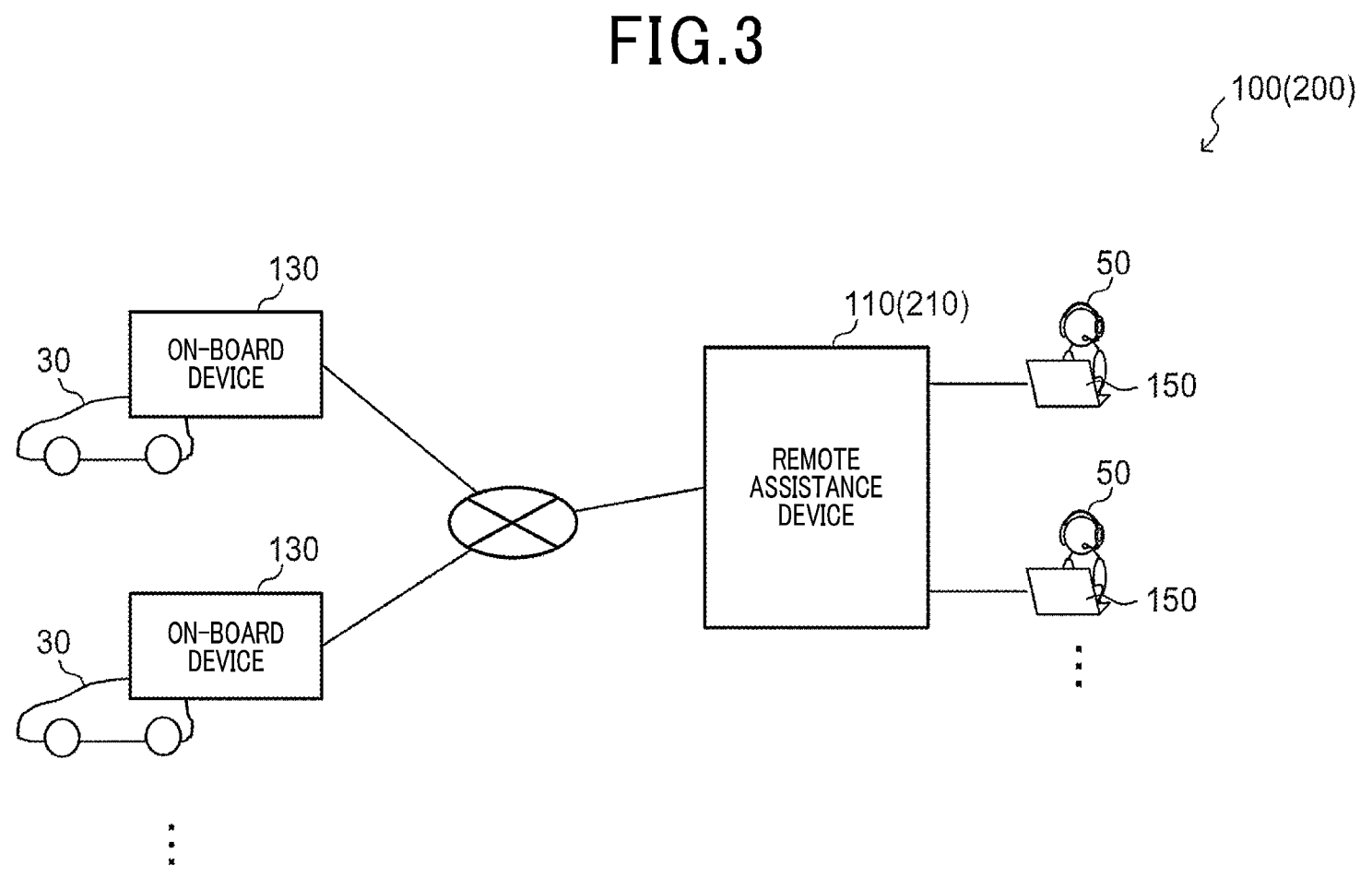

As illustrated in FIG. 3, an autonomous driving system 100 according to a first embodiment includes a remote assistance device 110 installed in a control center or deployed on a cloud, on-board devices 130 mounted to respective vehicles, and operator terminals 150 operated by respective operators 50. In the autonomous driving system 100, the number of on-board devices 130 and the number of operator terminals 150 are not limited to those in the example illustrated in FIG. 3.

In the autonomous driving system 100, vehicles, each used as a private car, a bus, a cab, a ride-shared car or the like, are controlled and driven autonomously by the respective on-board devices 130. Hereafter, a vehicle equipped with the on-board device 130 and driven autonomously is referred to as an autonomous driving (AD) vehicle 30. Each of the on-board devices 130 is connected to the remote assistance device 110 via a network, such as the Internet or the like. Each of the operator terminals 150 is also connected to the remote assistance device 110 via a network. Each of the on-board devices 130 and each of the operator terminals 150 are thus connected to each other via the remote assistance device 110. Like the remote assistance device 110, the operator terminals 150 may be disposed in the control center and connected to the remote assistance device 110 by an intranet, or may be disposed outside the control center and connected to the remote assistance device 110 by the internet.

Figure 4:
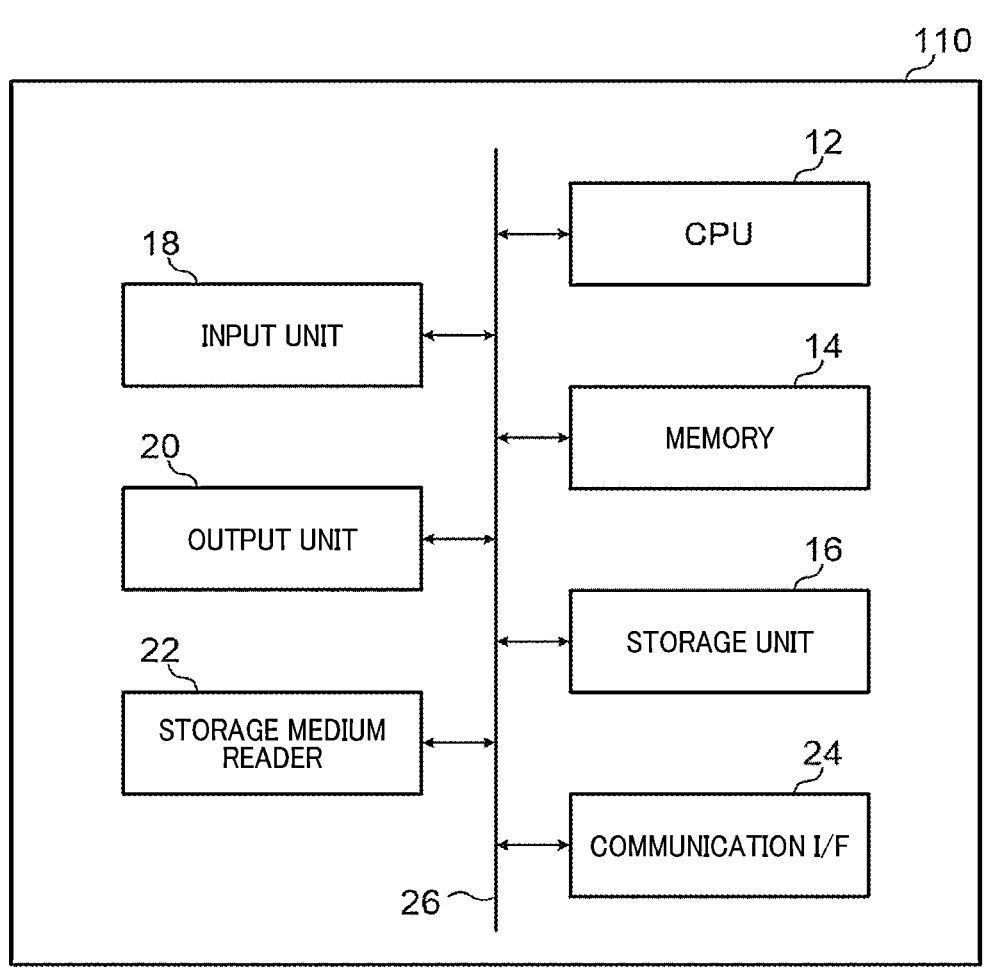
FIG. 4 is a block diagram of a hardware configuration of a remote assistance device.

The remote assistance device 110 is implemented by an information processing device, such as a personal computer, a server device or the like. FIG. 4 illustrates a hardware configuration of the remote assistance device 110. As illustrated in FIG. 4, the remote assistance device 110 includes a central processing unit (CPU) 12, a memory 14, a storage unit 16, an input unit 18, an output unit 20, a storage medium reader 22, and a communication interface (I/F) 24. These components are communicably connected to each other via a bus 26.

The storage unit 16 has an autonomous driving program stored for performing a remote assistance device-side autonomous driving process described later. The CPU 12 is a central processing unit that executes various programs and controls each component. That is, the CPU 12 reads the programs from the storage unit 16 and executes the programs using the memory 14 as a working area. The CPU 12 performs control of the above-mentioned various components and various arithmetic operations according to the programs stored in the storage unit 16.

The memory 14 is configured of a Random Access Memory (RAM) to temporarily store programs and data as a working area. The storage unit 16 is configured of a Read Only Memory (ROM), a Hard Disk Drive (HDD), a Solid-State Drive (SSD) or the like to store various programs, including the operating system, and various data.

The input unit 18 is provided for receiving various types of input, such as a keyboard, a mouse or the like. The output unit 20 is provided for outputting various types of information, such as a display, a printer or the like. Employing a touch panel display as the output unit 20 allows the touch panel display to function as the input unit 18.

The storage medium reader 22 reads data stored in various storage media, such as a Compact Disc (CD)-ROM, a Digital Versatile Disc (DVD)-ROM, a Blu-ray Disc, a Universal Serial Bus (USB) memory or the like to write data to the storage media.

The communication I/F 24 is an interface for communicating with other devices. For example, a standard, such as Ethernet (registered trademark), FDDI, Wi-Fi (registered trademark) or the like, is used.

Figure 5:
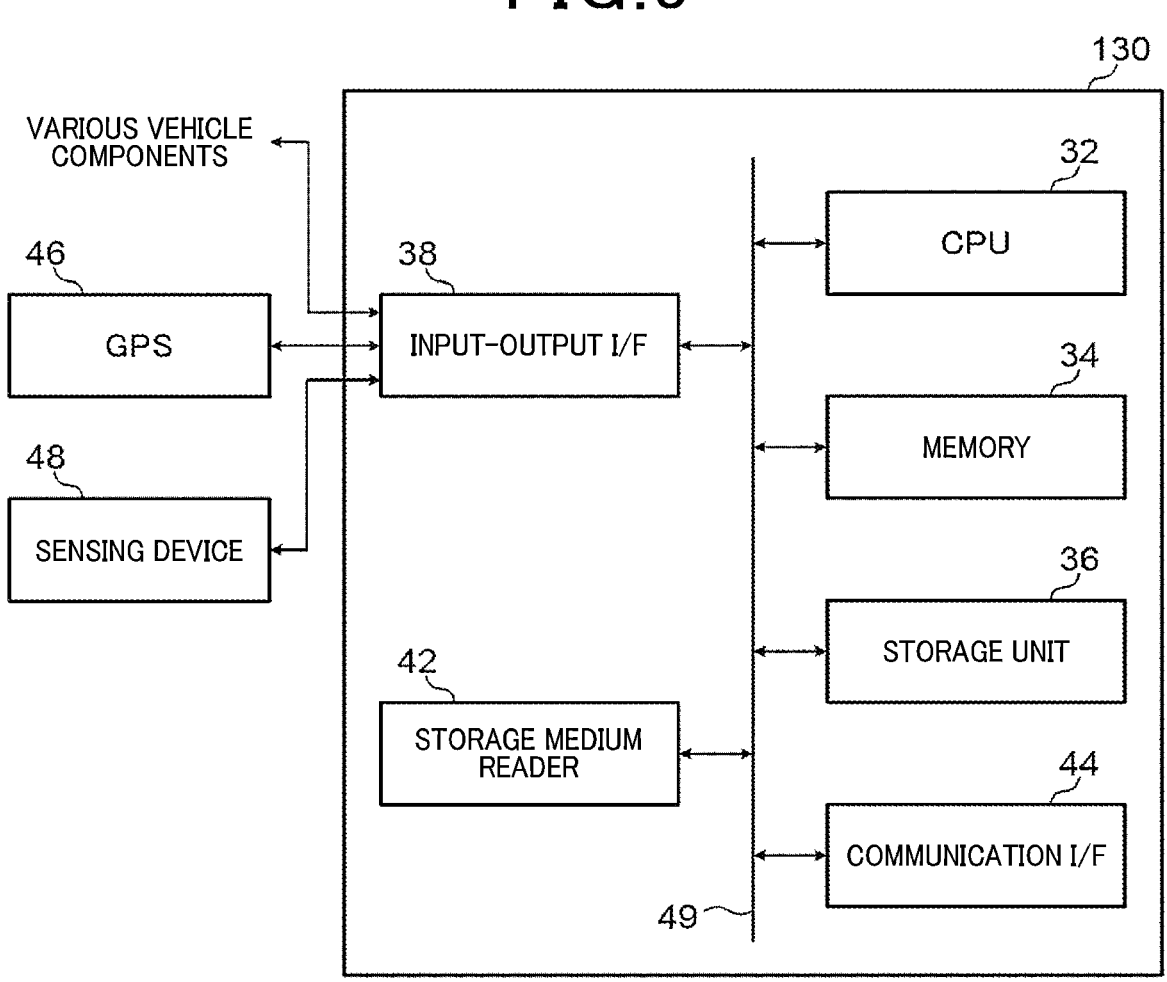
FIG. 5 is a block diagram of a hardware configuration of an on-board device.

Each of the on-board device 130 is implemented, for example, by an electronic control unit (ECU). FIG. 5 illustrates a hardware configuration of the on-board device 130. As illustrated in FIG. 5, like the remote assistance device 110, the on-board device 130 includes a CPU 32, a memory 34, a storage unit 36, an input/output I/F 38, a storage medium reader 42, and a communication I/F 44. The storage unit 36 has an autonomous driving program for performing an autonomous driving (AD) vehicle-side autonomous driving process described later. The respective components are communicably connected to each other via a bus 49. Various vehicle components, such as a GPS 46, a sensing device 48, and other ECUs, are connected to the input/output I/F 38.

The GPS 46 measures a location of the on-board device 130, that is, a location of the AD vehicle 30, and outputs location information at each positioning timing. The location information includes, for example, a latitude and a longitude. The sensing device 48 includes, for example, a camera, a laser radar or the like, and outputs sensing data as a result of sensing surroundings of the vehicle. Information indicating a vehicle state of the AD vehicle, such as a vehicle speed, an azimuth angle and the like, is input from various vehicle components to the on-board device 130.

Each of the operator terminals 150 is implemented by an information processing device, such as a personal computer, a tablet terminal or the like. A hardware configuration of the operator terminal 150 is generally the same as that of the remote assistance device 110 illustrated in FIG. 4 and duplicated description thereof will be omitted.

Figure 6:
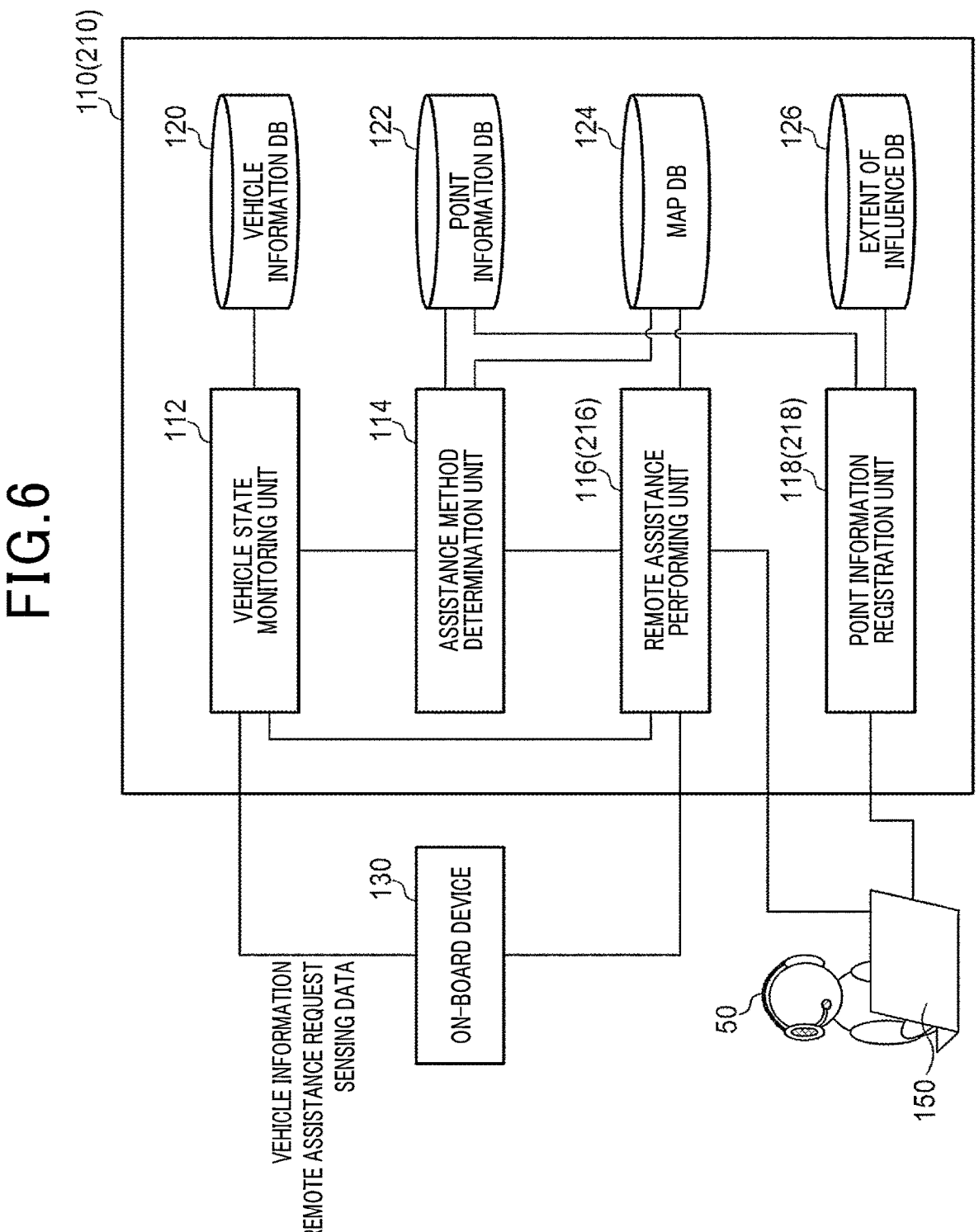
FIG. 6 is a functional block diagram of a remote assistance device according to each of a first and a second embodiment.

Functional blocks of the remote assistance device 110 of the first embodiment will now be described with reference to FIG. 6. As illustrated in FIG. 6, the remote assistance device 110 includes a vehicle state monitoring unit 112, an assistance method determination unit 114, a remote assistance performing unit 116, and a point information registration unit 118. Each functional block is implemented by the CPU 12 illustrated in FIG. 4. A vehicle information database (DB) 120, a point information DB 122, a map DB 124, and an extent of influence DB 126 are stored in a predefined storage area of the remote assistance device 110.

The vehicle state monitoring unit 112 acquires the vehicle information, remote assistance request, and sensing data transmitted from each of the on-board devices 130. The vehicle information includes a vehicle identifier (ID), which is identification information of the AD vehicle 30 (equipped with the on-board device 130), a vehicle speed, an azimuth angle, and other information detected by various vehicle components of the AD vehicle 30, and location information of the AD vehicle measured by the GPS 46. Upon acquiring the vehicle information, the vehicle state monitoring unit 112 assigns date and time to the acquired vehicle information and stores in the vehicle information DB 120 the vehicle information in association with the date and time, for example, as illustrated in FIG. 7.

The remote assistance request is information transmitted from the on-board device 130 when remote assistance is needed in the AD vehicle 30 (described in detail later). Upon acquiring the remote assistance request along with the vehicle information, the vehicle state monitoring unit 112 forwards the acquired remote assistance request and the vehicle information to the assistance method determination unit 114. Upon acquiring the sensing data, the vehicle state monitoring unit 112 forwards the acquired sensing data to the remote assistance performing unit 116.

For each of points where remote assistance was performed in the past for the AD vehicles 30, point information is registered in the point information DB 122, including the location where remote assistance was performed and information about an extent of influence determined at least by a distance from that location. FIG. 8 illustrates an example of the point information DB 122. In the example illustrated in FIG. 8, each row (each record) corresponds to the point information for one point. Each piece of point information includes a "point ID", which is identification information of the point, a "location", which is location information of that point, an original "cause" that caused the remote assistance request, an "extent of influence (distance)," a "extent of influence (duration)," a "countermeasure," a "feature quantity," and other information.

The extent of influence is a region in which autonomous driving of the AD vehicles 30 according to the predefined action plans may be affected due to traffic congestion or the like arising from the original "cause". The extent of influence (distance) is defined as a distance from the "location", and the extent of influence (duration) is defined as a duration when the "cause" is occurring. The detailed method of determining the extent of influence will be described later.

The "countermeasure" is a method of remote assistance from the remote assistance device 110. In the present embodiment, there are a method of automatically and remotely instructing the content of the behavior change, such as overtaking, changing lanes or the like, and another method of requesting the operator 50. The countermeasures will be described in detail later. In a case where it is necessary to wait for the natural resolution of the cause, such as traffic congestion, the "countermeasure" may be none (denoted by "-" in FIG. 8) since no remote assistance is performed.

The "feature quantity" is a feature quantity extracted from the sensing data of the situation around the point when the remote assistance was performed at that point. In the following, feature quantities included in the point information are also referred to as "registered features." Details of feature quantities will be described later.

Upon receiving a remote assistance request and vehicle information, the assistance method determination unit 114 determines whether the remote assistance request has occurred within the extent of influence included in one of pieces of point information registered in the point information DB 122. Specifically, the assistance method determination unit 114 searches the point information DB 122 for the point information whose "location" is within a predefined distance from the location of the AD vehicle 30 indicated by the location information included in the vehicle location information. In a case where a plurality of pieces of point information are retrieved, the assistance method determination unit 114 may refer to the map DB 124 to select, for example, the point information including the closest "location" that is ahead on the travel path of the AD vehicle 30. The map DB 124 has map data stored that includes information about a traffic environment, such as the number of lanes and traffic lights. The assistance method determination unit 114 may determine a direction of travel and a lane of travel of the AD vehicle 30 by mapping a travel trajectory of the AD vehicle represented by a time series of location information for each date and hour stored in the vehicle information DB 120 to map data. The assistance method determination unit 114 may acquire vehicle information from the AD vehicle 30, including information about a route to be traveled and the lane in which the vehicle is traveling.

The assistance method determination unit 114 determines whether the remote assistance request has occurred within the extent of influence, based on the "extent of influence (distance)" and "extent of influence (duration)" included in the retrieved point information. More specifically, based on the "extent of influence (duration)," the assistance method determination unit 114 determines that the remote assistance request has occurred within the extent of influence when the "cause" at the point indicated by the retrieved point information is still occurring and the AD vehicle 30 is located within the region identified by the "extent of influence (distance)."

Upon determining that the remote assistance request has occurred within the extent of influence, the assistance method determination unit 114 determines to perform remote assistance based on the point information and forwards the vehicle information and relevant point information to the remote assistance performing unit 116. Upon determining that the remote assistance request has occurred outside the extent of influence, the assistance method determination unit 114 determines to perform remote assistance by the operator 50, forwards the vehicle information to the remote assistance performing unit 116 to instruct requesting the operator 50.

Upon being instructed by the assistance method determination unit 114 to request an operator 50, the remote assistance performing unit 116 searches for an available operator 50. The remote assistance performing unit 116 acquires sensing data from the AD vehicle 30. The remote assistance performing unit 116 displays a screen with an image of the acquired sensing data on the operator terminal 150 corresponding to the searched operator 50, and also instructs remote assistance. The remote assistance performing unit 116 transmits the remote-control information generated based on the operator 50's operation on the operator terminal 150 to the on-board device 130.

Upon receipt of the vehicle information and the point information, the remote assistance performing unit 116 determines whether a countermeasure is registered in the point information. Specifically, in the case where the "COUNTERMEASURE" in the point information is other than "NONE," the remote assistance performing unit 116 determines that a countermeasure has been registered. In the case where the "COUNTERMEASURE" in the point information is "NONE", the remote assistance performing unit 116 determines that no countermeasure has been registered. If no countermeasure is registered, the remote assistance performing unit 116 instructs continuation of autonomous driving based on the predefined action plan. This instruction may include explicitly instructing the AD vehicle 30 to follow the preceding vehicle or to notify the AD vehicle 30 that a behavior change is not needed.

In a case where a countermeasure is registered, the remote assistance performing unit 116 instructs the on-board device 130 to transmit sensing data and acquire the sensing data indicating the current state of the surroundings of the AD vehicle 30. The remote assistance performing unit 116 extracts feature quantities ("sensor features") from the acquired sensing data and determines whether the sensor features match the registered features included in the received point information. For example, in a case where the similarity between the sensor features and the registered features is greater or equal to a predefined value, the remote assistance performing unit 116 may determine that the sensor features and the registered features match. In a case where both the sensor features and the registered features do not match, the remote assistance performing unit 116 instructs continuation of autonomous driving based on the predefined action plan as well as transmission of sensing data, as in the case where no countermeasure has been registered.

In a case where both the sensor features and the registered features match, the remote assistance performing unit 116 performs remote assistance in accordance with the countermeasure included in the point information. Specifically, in a case where a behavior change is registered as a countermeasure, the remote assistance performing unit 116 generates remote-control information based on the content of the behavior change and transmits it to the on-board device 130. For example, as remote-control information, an action to be taken during the behavior change, or a travel trajectory to be traveled during the behavior change, etc. are generated. In the case where requesting an operator is registered as a countermeasure, the remote assistance performing unit 116 performs the same remote assistance as described above in the case where requesting the operator 50 is instructed by the assistance method determination unit 114.

Figure 9:
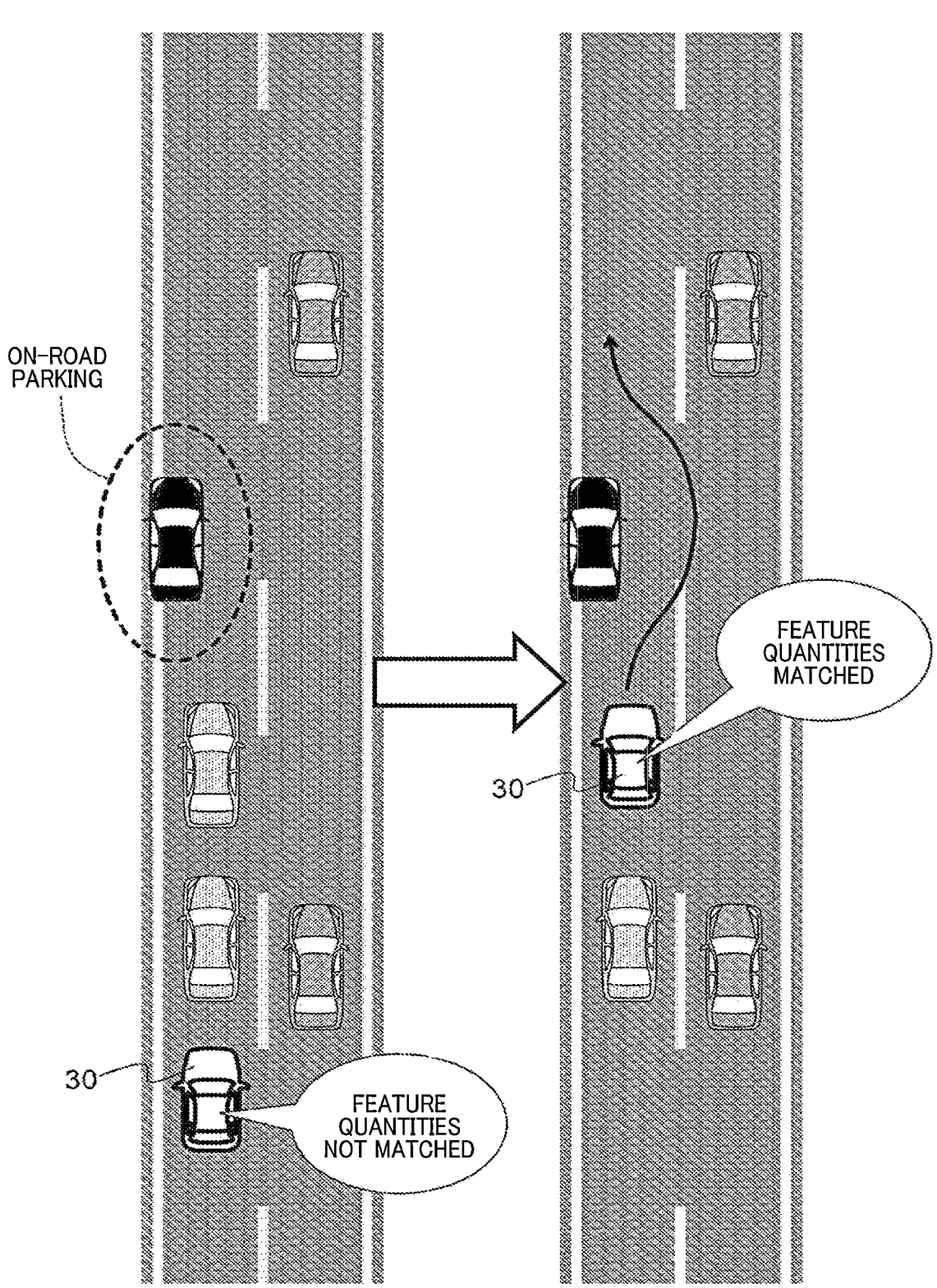
FIG. 9 is an illustration of a comparison between sensor features and registered features.

For example, suppose that a remote assistance request occurs at the location of the AD vehicle 30 illustrated in the left portion of FIG. 9, in a case where point information including registered features indicating on-road parking (as indicated by the dashed oval in the left portion of FIG. 9) has been registered. At this time, the remote assistance performing unit 116 determines that a remote assistance request has occurred due to traffic congestion or the like caused by on-street parking as the registered features do not match sensor features, and instructs continuation of autonomous driving based on the action plan. Suppose that, during autonomous driving based on the action plan, the AD vehicle 30 moves gradually forward and reaches the location illustrated in the right portion of FIG. 9, and the registered features come to match the sensor features. This allows the remote assistance performing unit 116 to determine that the point where remote assistance is originally to be performed has been reached, and in accordance with the countermeasure included in the point information, generate remote-control information, for example, a travel trajectory (solid arrow in FIG. 9) indicating overtaking as a change in behavior, and transmit the remote-control information to the on-board controller 130.

Figure 10:
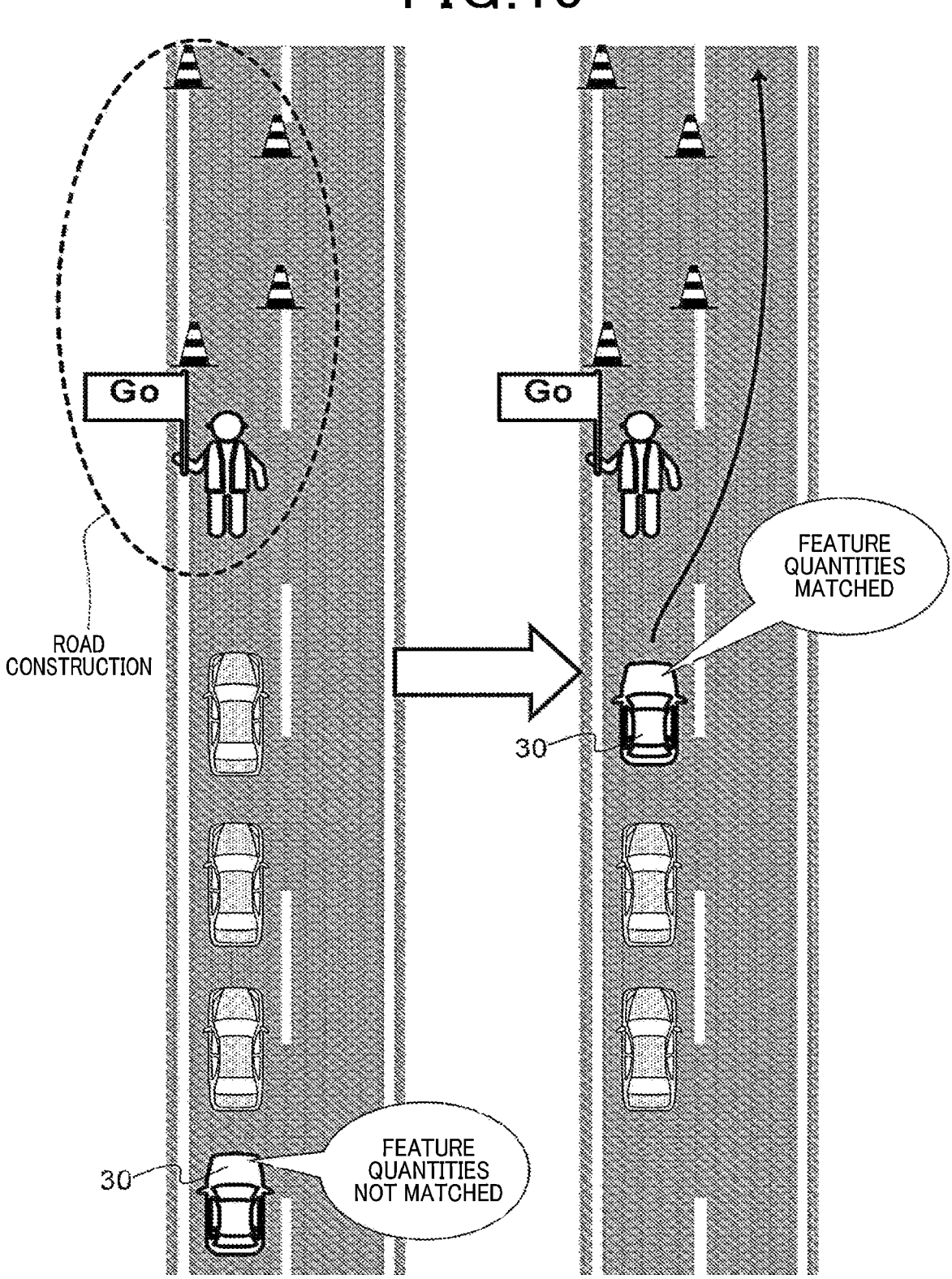
FIG. 10 is an illustration of a comparison between sensor features and registered features.

As another example, suppose that a remote assistance request occurs at the location of the AD vehicle 30 illustrated in the left portion of FIG. 10, in a case where point information including registered features indicating road construction (as indicated by the dashed oval in the left portion of FIG. 10) has been registered. At this time, the remote assistance performing unit 116 determines that a remote assistance request has occurred due to traffic congestion or the like caused by road construction as the registered features do not match sensor features, and instructs continuation of autonomous driving based on the action plan. Suppose that, during autonomous driving based on the action plan, the AD vehicle 30 moves gradually forward and reaches the location illustrated in the right portion of FIG. 10, and the registered features come to match the sensor features. This causes the remote assistance performing unit 116, for example, to request the operator 50, according to the countermeasure included in the point information. The remote assistance performing unit 116 receives a travel trajectory (as indicated by the solid arrow in FIG. 10) that avoids the road construction site, which is generated by the operator 50 operating the operator terminal 150. The remote assistance performing unit 116 generates and transmits remote-control information to the on-board device 130 such that the vehicle travels along the received travel trajectory, at the timing when the operator 50 confirms the guide's semaphore indicating a go-ahead.

As described above, when a remote assistance request occurs within the extent of influence of traffic congestion or the like arising from the original cause of the remote assistance request, remote assistance is temporarily withheld until the AD vehicle 30 reaches the point where the remote assistance should originally be performed. This may suppress occurrence of unnecessary requests for the operator 50 and execution of an inappropriate remote instruction.

In the case where it is determined that occurrence of a remote assistance request is not within the extent of influence and remote assistance is performed by the operator 50, the point information registration unit 118 generates point information regarding the remote assistance performed and registers it in the point information DB 122. Specifically, the point information registration unit 118 receives from the operator 50, via the operator terminal 150, the cause of the remote assistance request, information about the location of an obstacle that caused the request, and the content of a countermeasure, such as a behavior change or the like.

More specifically, the operator 50 specifies a region of the obstacle as a cause in the camera-captured image around the AD vehicle 30 or the three-dimensional point cloud data from laser radar, displayed on the operator terminal 150. For example, in a case where the cause is on-road parking, a region in the camera-captured image or three-dimensional point cloud data of the vehicle parked on the road is specified. The cause and the content of the countermeasure are entered directly into the operator terminal 150 by the operator 50, or by selection from a pull-down menu. The information specified and entered into the operator terminal 150 is transmitted to the remote assistance device 110.

The point information registration unit 118 identifies the location of the obstacle in the world coordinate system based on the location of the region on the camera-captured image or three-dimensional point cloud data of the obstacle as the cause and the location of the AD vehicle 30, and makes this location the "location" (hereinafter also called "location of the point") to be registered in the point information. Alternatively, since the obstacle and the AD vehicle 30 are located in close proximity at the time when the remote assistance is performed, the location of the AD vehicle 30 may be used as the location of the point. Even in a case where there is no specific obstacle that is a cause for the remote assistance request, such as in a case where the cause is traffic congestion, the location of the AD vehicle 30 may be used as the location of the point. Furthermore, the point information registration unit 118 extracts feature quantities that are registered features from the region on the camera-captured image or on the three-dimensional point cloud data of the obstacle as the cause.

Figure 12:
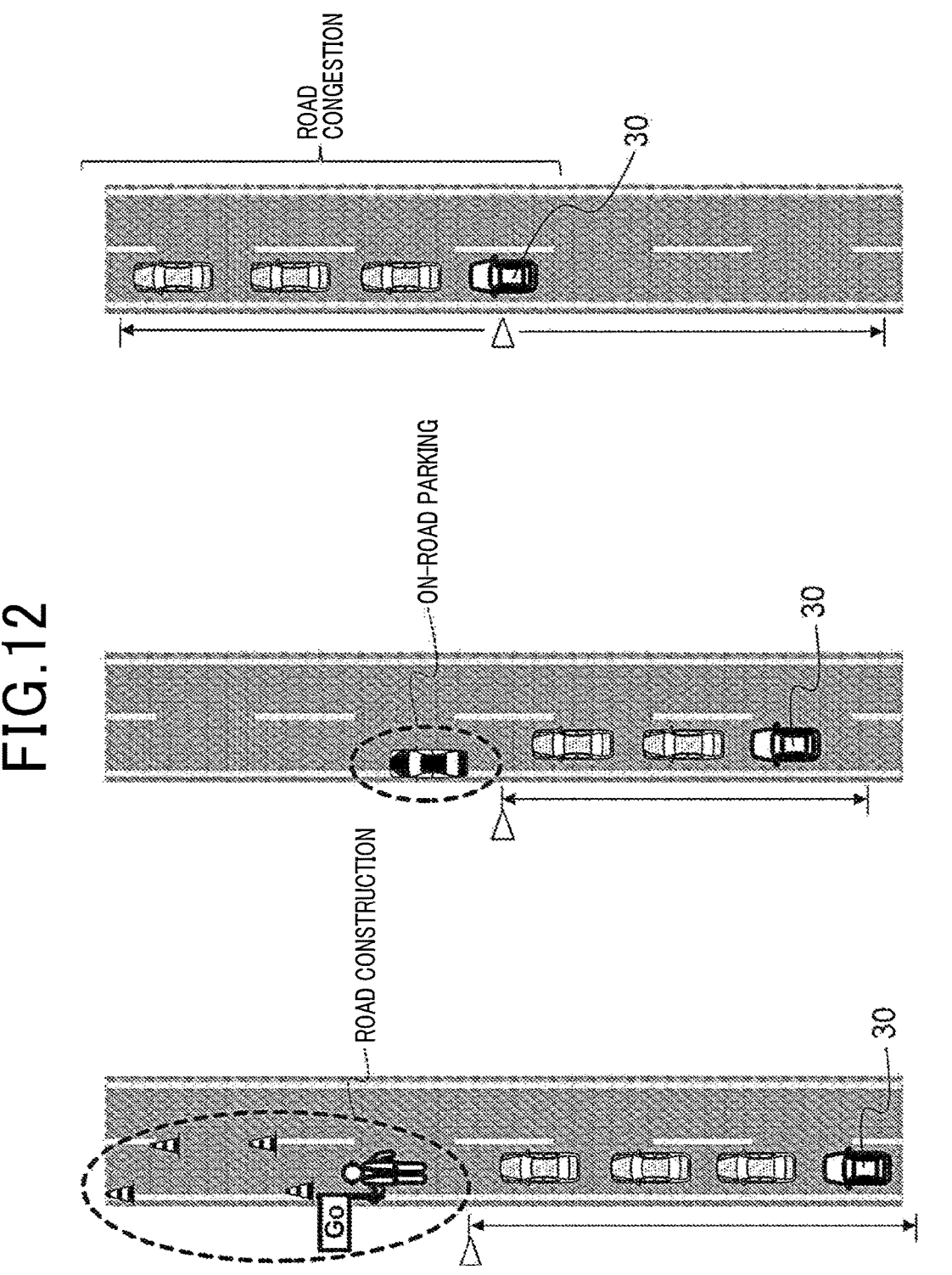
FIG. 12 is an illustration of an example of how to determine an extent of influence.

The point information registration unit 118 determines the extent of influence based on the cause of the remote assistance request. For example, the point information registration unit 118 determines the extent of influence to be registered as point information with reference to the extent of influence DB 126 that defines a default value of the extent of influence for each cause. FIG. 11 illustrates an example of the extent of influence DB 126. In the example illustrated in FIG. 11, the "extent of influence (distance)" is a distance from the location of the point. As illustrated in FIG. 12, in a case where the cause is road construction, on-road parking or the like, the extent of influence is defined as a distance from the obstacle as the cause at the location of the point, downstream in the direction of travel of the vehicle. In a case where the location of the obstacle or the like as the cause is expected to change over time, as in a case where the cause is road construction or the like, the extent of influence is defined as a distance from the obstacle downstream or upstream in the direction of travel of the vehicle.

The "extent of influence (duration)" is, according to the cause, an estimated duration of the cause from its occurrence to elimination. In the example illustrated in FIG. 11, in the case where the cause is road construction, when registering point information, construction information is acquired from an external organization or the like, and the date and time when the road construction takes place is determined as the "extent of influence (duration)" to be registered as point information.

Figure 13:
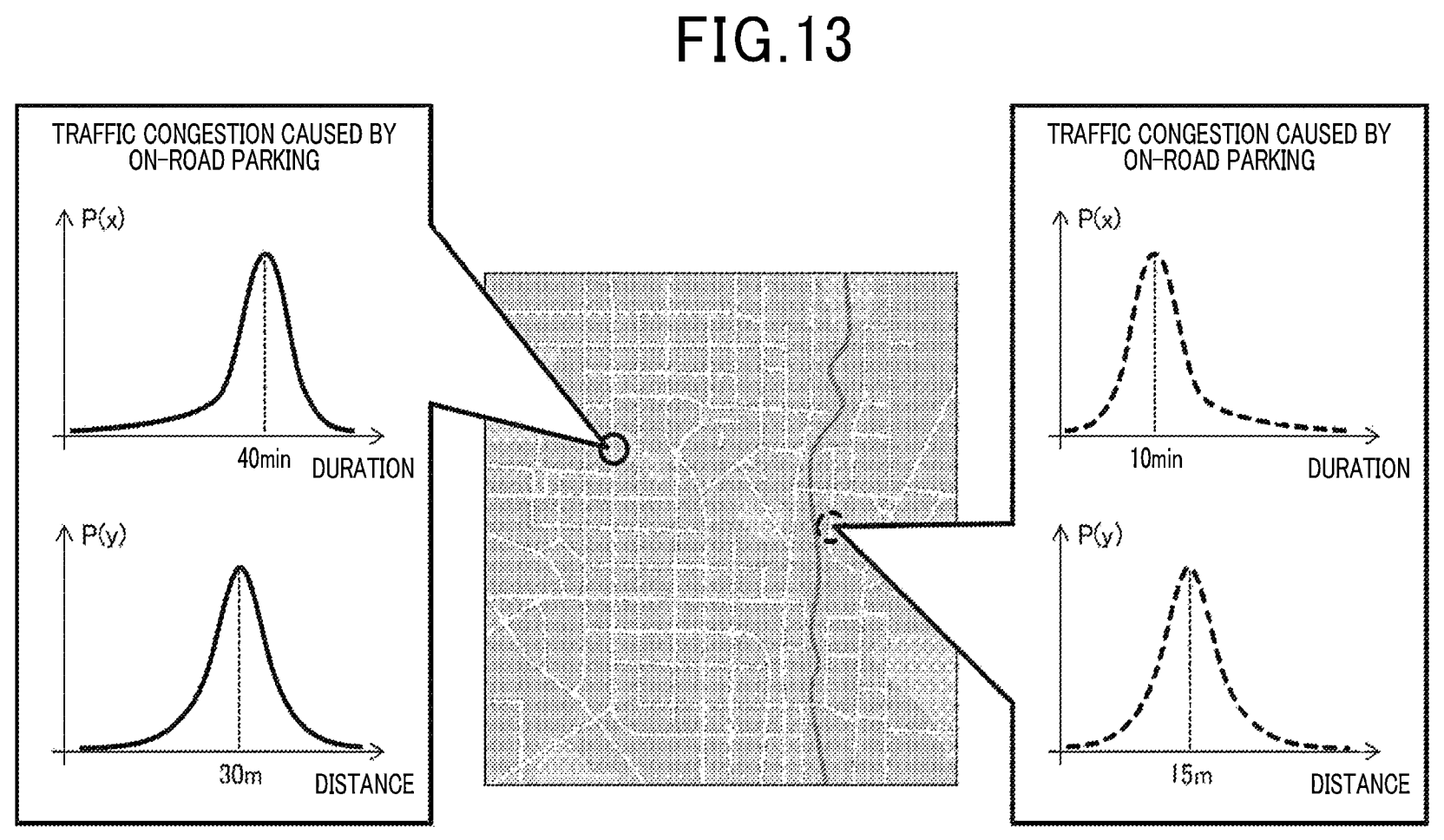

A method for determining the extent of influence is not limited to those examples using the extent of influence DB 126 described above. For example, the point information registration unit 118 may determine the extent of influence to be registered as point information based on statistical information on past traffic around the point. With reference to FIG. 13, the case of on-road parking will now be described more specifically by way of example. For respective points where on-road parking has occurred in the past, the durations and distances of traffic congestion caused by such on-road parking are totaled to calculate a probability distribution $P(x)$ of durations and a probability distribution $P(y)$ of distances. The duration at which the probability distribution $P(x)$ takes the maximum value may be determined as the "extent of influence (duration)", and the distance at which the probability distribution $P(y)$ takes the maximum value may be determined as the "extent of influence (distance)". Alternatively, the duration and distance at which the simultaneous probability $P(x, y)$ of durations and distances takes the maximum value may be determined as the "extent of influence (duration)" and "extent of influence (distance)". Alternatively to determining the probability distributions, for each point where on-road parking has occurred in the past, the durations and distances of the traffic congestion caused by the on-road parking may be aggregated, and statistics, such as the mean, median or the like, may be determined, and these statistics may be used to determine the "extent of influence (duration)" and "extent of influence (distance)".

The point information registration unit 118 may correct the extent of influence determined as described above based on at least one of the time of day when remote assistance is performed and road characteristics at the corresponding point. For example, with the rush hour time of day predetermined, the point information registration unit 118 multiplies the extent of influence determined as above by n (n>1, e.g., 1.5) in a case where the time when remote assistance is performed is included in this time of day. Alternatively or additionally, the point information registration unit 118 acquires road characteristics at points where remote assistance was performed from the map DB 124. For example, in a case where the road at the point where remote assistance was performed has one lane in each direction, the point information registration unit 118 multiplies the extent of influence determined as described above by n (n>1, e.g., 1.5). This allows the extent of influence to be optimized based on at least either of the time of day and road characteristics.

The point information registration unit 118 deletes, among the point information registered in the point information DB 122, the point information for which the time specified in the "extent of influence (duration)" has elapsed. For example, for point information having the "extent of influence (duration)" registered as a duration such as "30 minutes," the point information registration unit 118 deletes such point information when 30 minutes have elapsed since the point information was registered in the point information DB 122. For example, for point information having the "extent of influence (duration)" registered as a period of time specifying the date and time, the point information registration unit 118 deletes such point information when 30 minutes have elapsed since the point information was registered in the point information DB 122. Furthermore, the point information registration unit 118 determines, based on the travel trajectory of each AD vehicle 30 acquired from the vehicle information DB 120, whether at least one of the AD vehicles 30 has passed a point indicated by the point information registration unit 122 without requesting remote assistance. In a case where at least one of the AD vehicles 30 has passed without requesting remote assistance, the point information registration unit 118 deletes the point information for that point from the point information DB 122.

Figure 14:
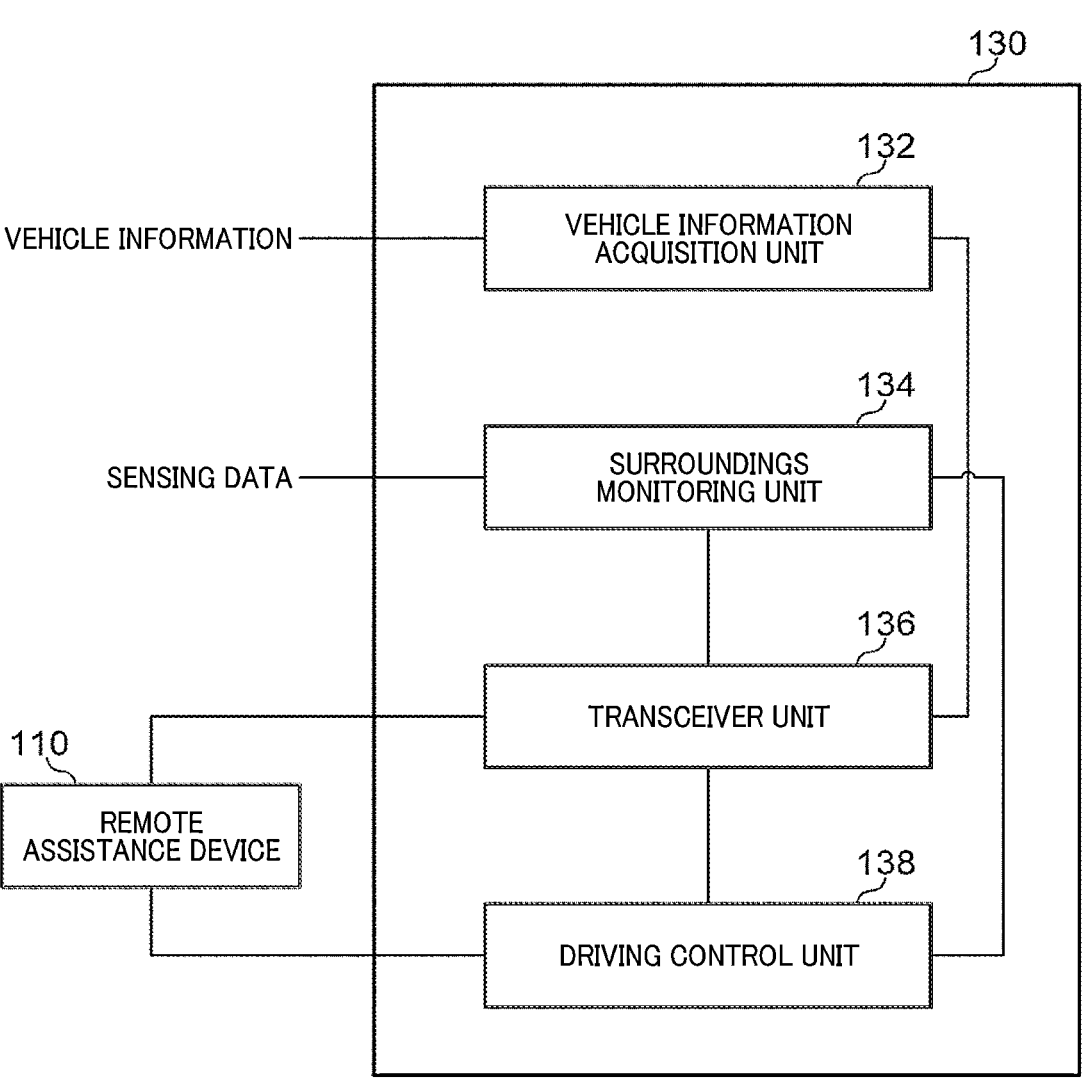
FIG. 14 is a functional block diagram of the on-board device according to each of the first and second embodiments.

Functional blocks of each on-board device 130 according to the first embodiment will now be described with reference to FIG. 14. As illustrated in FIG. 14, the on-board device 130 includes a vehicle information acquisition unit 132, a surroundings monitoring unit 134, a transceiver unit 136, and a driving control unit 138. Each functional block is performed by the CPU 32 illustrated in FIG. 5.

The vehicle information acquisition unit 132 acquires vehicle information, including the vehicle speed, azimuth angle, and other information detected by various vehicle components of the AD vehicle 30, and vehicle point information of the AD vehicle 30 measured by the GPS 46, and forwards the acquired vehicle information to the transceiver unit 136.

The surroundings monitoring unit 134 acquires sensing data output from the sensing device 48 that senses surroundings of the AD vehicle 30. As described above, the sensing device 48 includes, for example, a camera or laser radar, and the sensing data includes, for example, camera-captured images of surroundings of the AD vehicle or three-dimensional point cloud data indicating the three-dimensional coordinates of other vehicles, buildings or other objects around the AD vehicle 30 measured by the laser radar. Based on the acquired sensing data, the surroundings monitoring unit 134 determines whether the travel path based on the predefined action plan is occluded.

Specifically, the surroundings monitoring unit 134 determines the presence or absence of an obstacle occluding the travel path based on camera images or three-dimensional point cloud data. The obstacle may be a stationary object or moving object moving at or below a predefined speed. This allows a preceding vehicle that is temporarily stopped or moving slowly due to traffic congestion or the like to be determined to be an obstacle. The surroundings monitoring unit 134 notifies the transceiver unit 136 of a result of determination as to whether the travel path is occluded, and forwards the acquired sensing data to the transceiver unit 136 and the driving control unit 138.

The transceiver unit 136 adds the vehicle ID of the AD vehicle 30 to the vehicle information received from the vehicle information acquisition unit 132 and transmits it to the remote assistance device 110 at regular intervals. The transceiver unit 136 receives instructions regarding remote assistance from the remote assistance device 110. The instructions regarding remote assistance include remote-control information based on the countermeasure registered in the point information or the operation of the operator 50, an instruction to continue autonomous driving based on the predefined action plan, and an instruction to transmit sensing data. Upon receiving from the remote assistance device 110 the instruction to transmit sensing data, the transceiver unit 136 transmits the sensing data received from the surroundings monitoring unit 134 to the remote assistance device 110. When the transceiver unit 136 is notified by the surroundings monitoring unit 134 of a result of determination that the travel path is occluded and has not received any instructions for remote assistance from the remote assistance device 110, the transceiver unit 136 transmits a remote assistance request to the remote assistance device 110 along with the vehicle information. Upon receiving remote-control information from the remote assistance device 110, the transceiver unit 136 forwards the received remote-control information to the driving control unit 138.

The driving control unit 138 performs autonomous driving control based on the action plan in a case where remote assistance is not requested or in a case where the remote assistance device 110 has instructed continuation of autonomous driving based on the action plan. Since autonomous driving in such a case may be implemented using, for example, conventionally known methods for Level 4 autonomous driving, based on a preset travel path, sensing data indicating the surroundings of the AD vehicle 30, information in the map DB 124, or the like, detailed description will be omitted.

Upon receiving the remote-control information from the transceiver unit 136, the driving control unit 138 performs autonomous driving control based on the action plan reflecting the remote-control information. This allows the driving control unit 138 to control, based on the sensing data, while taking into account movement of other vehicles, the AD vehicle 30 to travel a travel path that avoids the obstacle that caused the remote assistance request, for example, as indicated by the solid arrow in FIG. 9 or FIG. 10.

The operations of the autonomous driving system 100 according to the first embodiment will now be described. For each AD vehicle 30, an action plan is set in the AD vehicle 30, and the on-board device 130 initiates controlling autonomous driving based on the action plan. The vehicle information acquisition unit 132 acquires vehicle information from various vehicle components of the AD vehicle 30 and the GPS 46, and the transceiver unit 136 regularly performs a process of transmitting the vehicle information with the vehicle ID added, to the remote assistance device 110. In the remote assistance device 110, the vehicle state monitoring unit 112 stores the received vehicle information in the vehicle information DB 120.

Figure 15:
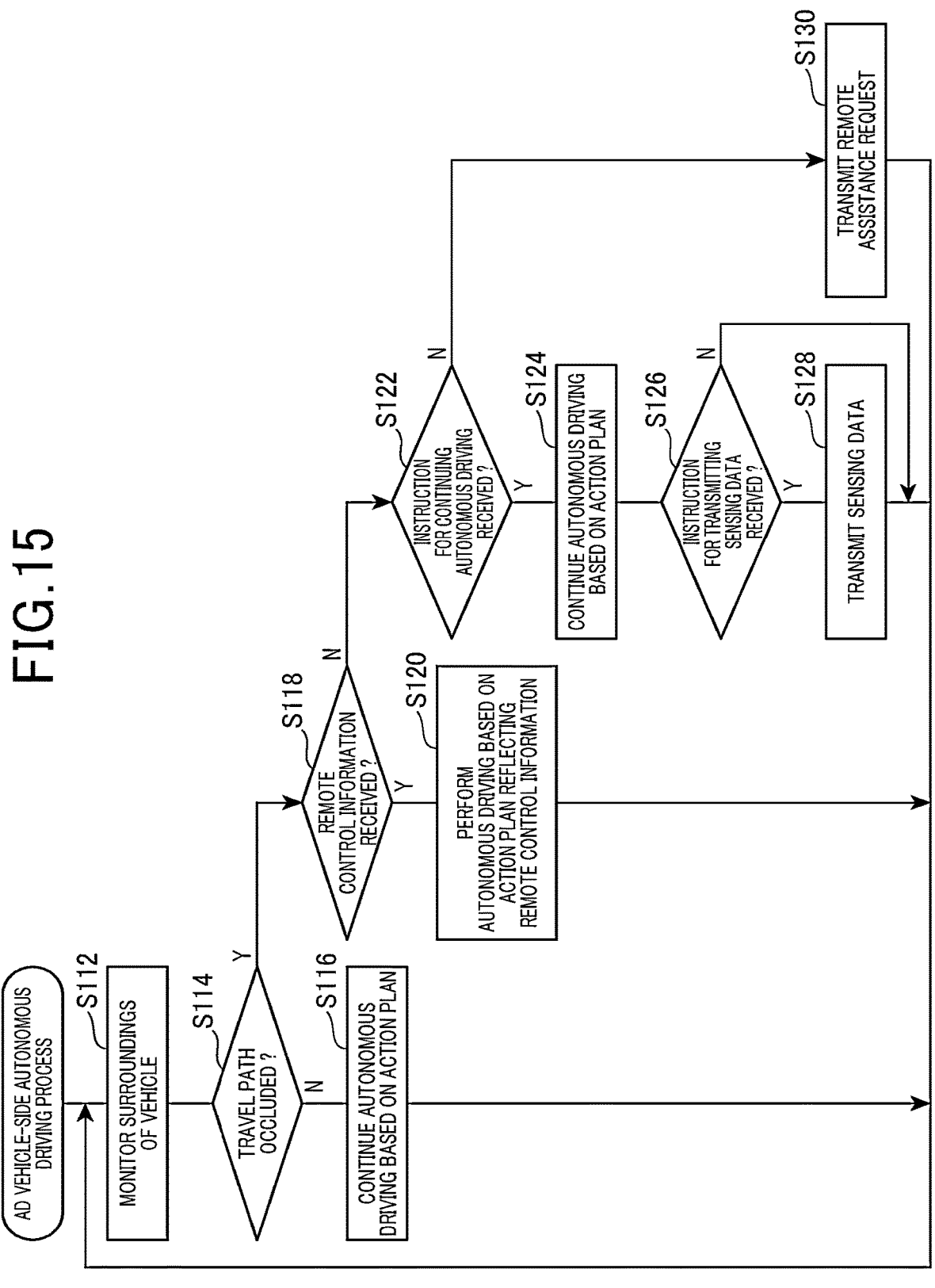
FIG. 15 is a flowchart of an example autonomous driving process on the AD vehicle side according to the first embodiment.
Figure 16:
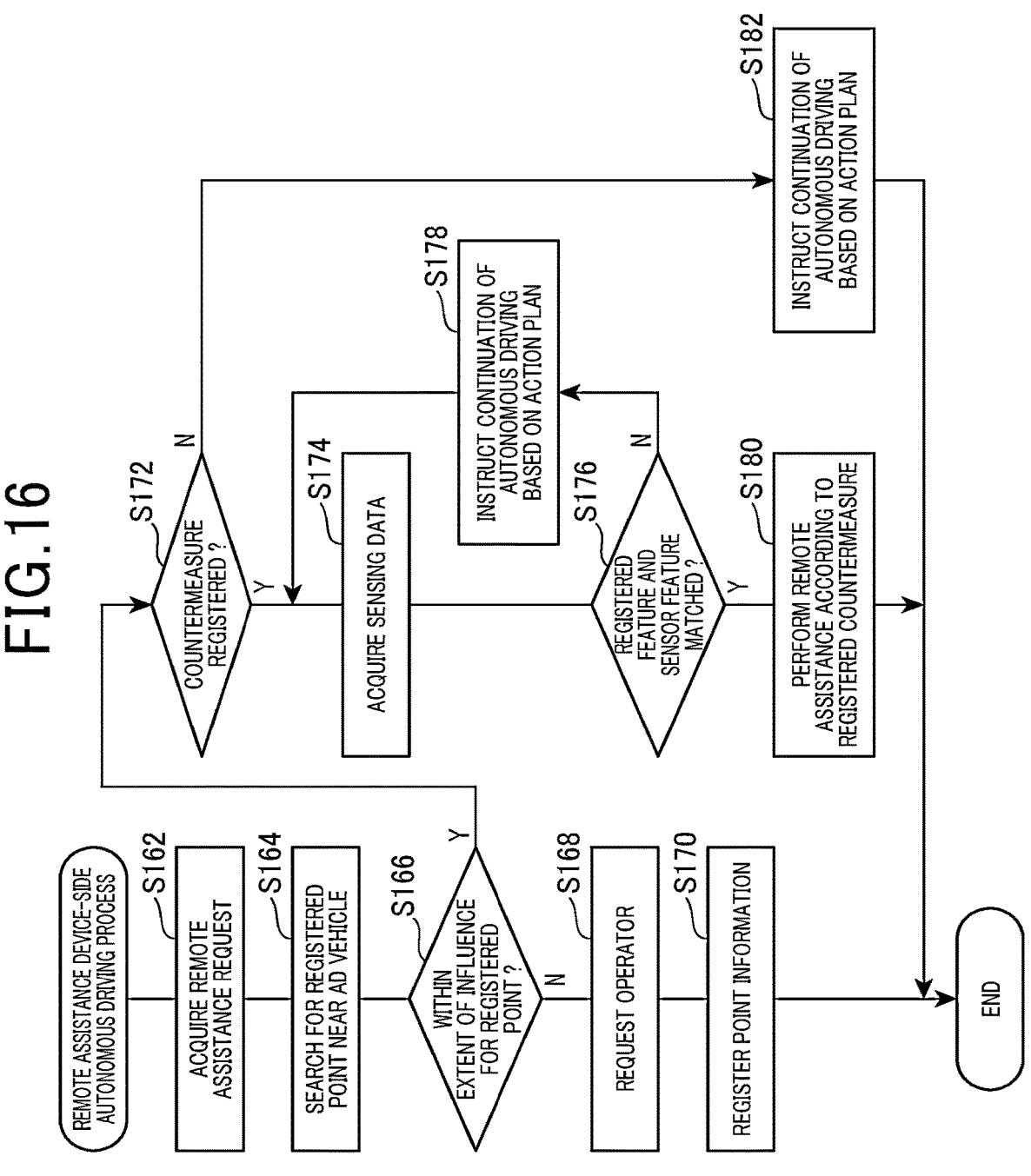
FIG. 16 is a flowchart of an example autonomous driving process on the remote assistance device side according to the first embodiment.

In parallel with the above process, the AD vehicle-side autonomous driving process illustrated in FIG. 15 is performed in the on-board device 130. Upon the remote assistance device 110 receiving the remote assistance request transmitted from the on-board device 130, the remote assistance device-side autonomous driving assistance process illustrated in FIG. 16 is performed in the remote assistance device 110. Each of the AD vehicle-side autonomous driving process and the remote assistance device-side autonomous driving process is described in detail below. The AD vehicle-side autonomous driving process and the remote assistance device-side autonomous driving process are an example of the autonomous driving method of the present disclosure.

An example of the AD vehicle-side autonomous driving process will now be described with reference to FIG. 15.

At step S112, the surroundings monitoring unit 134 acquires the sensing data output from the sensing device 48. The surroundings monitoring unit 134 monitors surroundings of the AD vehicle 30 by determining, based on the acquired sensing data, whether the travel path based on the predefined action plan has been occluded.

At step S114, the transceiver unit 136 determines whether the result of determination at step S112 by the surroundings monitoring unit 134 indicates that the travel path is occluded. If the travel path is not occluded, the process flow proceeds to step S116. If the travel path is occluded, the process flow proceeds to step S118.

At step S116, the driving control unit 138 continues controlling autonomous driving based on the action plan, and the process flow returns to step S112.

At step S118, the transceiver unit 136 determines whether the remote-control information has already been received from the remote assistance device 110. If the remote-control information has already been received, that is, if the action plan needs to be changed based on the content of the behavior change registered in the point information or the content of the behavior change entered by the operator, the process flow proceeds to step S120. If the remote-control information has not yet been received, the process flow proceeds to step S122. At step S120, the driving control unit 138 performs control of autonomous driving based on the action plan reflecting the received remote-control information, and the process flow returns to step S112.

At step S122, the transceiver unit 136 determines whether an instruction for continuing autonomous driving based on the action plan has already been received from the remote assistance device 110. If an instruction for continuing autonomous driving based on the action plan has already been received, the process flow proceeds to step S124. If no such instruction has been received, the process flow proceeds to step S130. At step S124, the driving control unit 138 continues autonomous driving based on the action plan.

At step S126, the transceiver unit 136 determines whether an instruction for transmitting the sensing data has already been received from the remote assistance device 110. If an instruction for transmitting the sensing data has already been received, the process flow proceeds to step S128, where the transceiver unit 136 transmits the sensing data to the remote assistance device 110, and the process flow returns to step S112. If an instruction for transmitting sensing data has not been received, step S128 is skipped and the process flow returns to step S112.

At step S130, the transceiver unit 136 transmits a remote assistance request along with the vehicle information to the remote assistance device 110, and the process flow returns to step S112.

An example of the remote assistance device-side autonomous driving process will now be described with reference to FIG. 16.

At step S162, the vehicle state monitoring unit 112 acquires the remote assistance request transmitted from the on-board device 130 along with the vehicle information acquisition unit. Subsequently, at step S164, the assistance method determination unit 114 searches the point information DB 122 for point information with a "location" within a predefined distance from the location of the AD vehicle 30 indicated by the location information included in the acquired vehicle information. That is, point information is retrieved for the registered point in the vicinity of the 30 AD vehicle.

At step S166, the assistance method determination unit 114 determines whether a remote assistance request has occurred within the extent of influence for the registered point based on the "extent of influence (distance)" and "extent of influence (duration)" included in the retrieved point information. If the answer is "YES", then the process flow proceeds to step S172. If the answer is "NO", then the process flow proceeds to step S168. If no point information retrieved from the point information DB 122, at step S164, for the registered point in the vicinity of the AD vehicle 30, the process flow also proceeds to step S168.

At step S168, the assistance method determination unit 114 determines to perform remote assistance by the operator 50, and the remote assistance performing unit 116 requests the operator 50, performs remote assistance by the operator 50, and transmits remote-control information to the on-board device 130.

Subsequently, at step S170, the point information registration unit 118 receives from the operator 50, via the operator terminal 150, information about the cause of the remote assistance request, the location of the obstacle that caused the remote assistance request, and the content of a countermeasure, such as a behavior change. The point information registration unit 118 generates point information based on the received information and registers it in the point information DB 122. Then, the remote assistance device-side autonomous driving process flow ends.

At step S172, the remote assistance performing unit 116 determines whether the point information retrieved at step S164 has a countermeasure registered. If the answer is "YES", then the process flow proceeds to step S174. If the answer is "NO", then the process flow proceeds to step S182.

At step S174, the remote assistance performing unit 116 instructs the on-board device 130 to transmit sensing data to acquire sensing data indicating the current state of surroundings of the AD vehicle 30. At step S176, the remote assistance performing unit 116 then determines whether sensor features extracted from the acquired sensing data match registered features included in the point information retrieved at step S164. If both the sensor features and registered features match, the process flow proceeds to step S180. If not, the process flow proceeds to step S178.

At step S178, execution of remote assistance is temporarily withheld, the transceiver unit 136 transmits to the on-board device 130 an instruction for continuing autonomous driving based on the predefined action plan, and the processing flow returns to step S174.

At step S180, the remote assistance performing unit 116 performs remote assistance according to the countermeasure included in the point information retrieved at step S164 as the AD vehicle 30 has approached close to the obstacle as the original cause of the remote assistance request. The remote assistance device-side autonomous driving process is then ended.

At step S182, the transceiver unit 136 transmits to the on-board device 130 an instruction for continuing autonomous driving based on the predefined action plan, in order to wait for spontaneous resolution of the cause, such as traffic congestion. The remote assistance device-side autonomous driving process is then ended.

As described above, the autonomous driving system according to the first embodiment registers point information, including information about the extent of influence, for each point where remote assistance has been performed in the past for any one of the AD vehicles. Upon occurrence of a request for remote assistance from an AD vehicle within the extent of influence included in the registered point information, execution of remote assistance is temporarily withheld and autonomous driving based on the action plan is continued. This can suppress occurrence of unnecessary requests for operators.

In the autonomous driving system according to the first embodiment, remote assistance is performed when registered features match sensor features, that is, when the AD vehicle has approached close to the obstacle as the original cause of the remote assistance request. This can ensure that remote assistance is performed at the appropriate timing, and can suppress execution of inappropriate remote assistance.

Modification to First Embodiment

Figure 17:
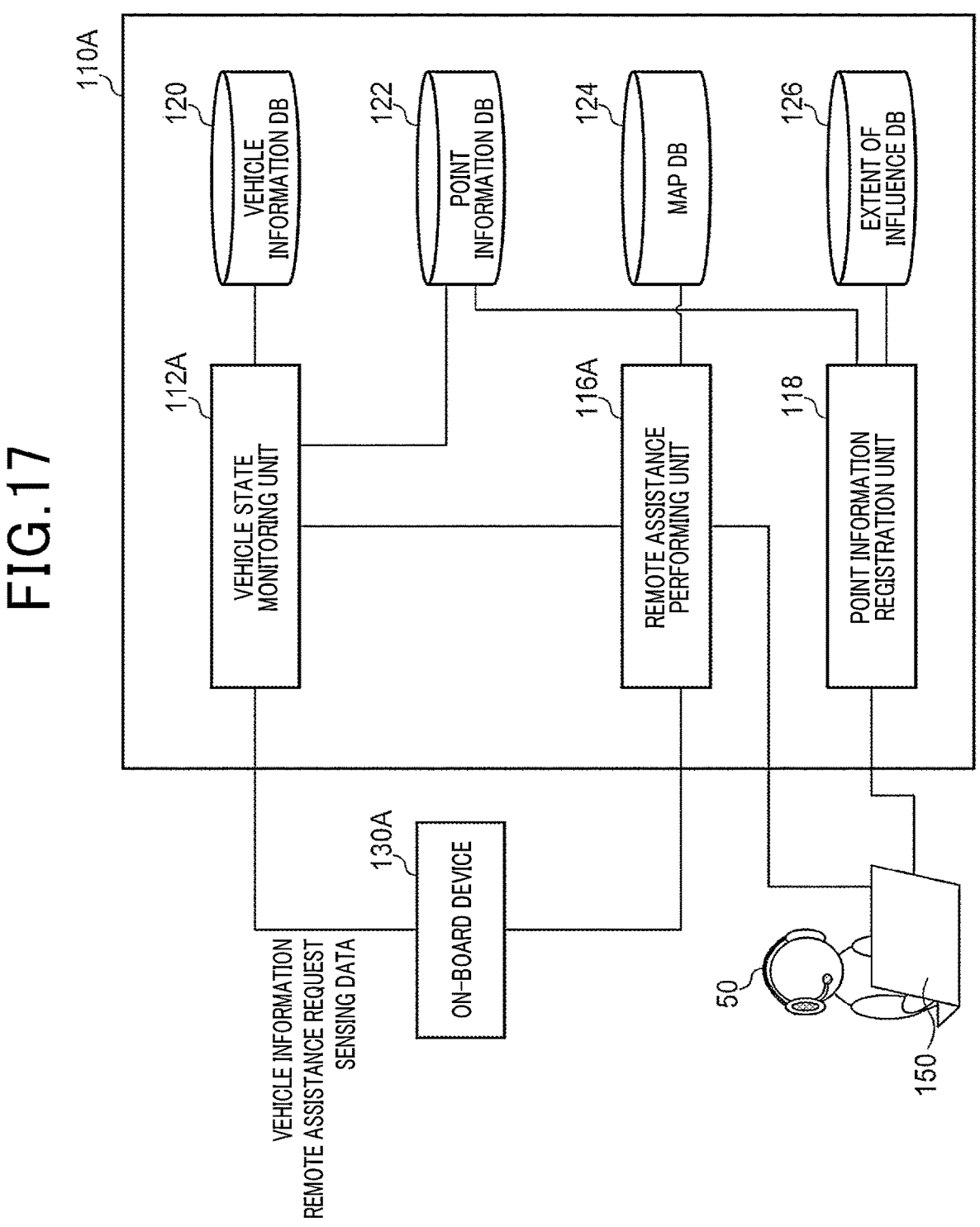
FIG. 17 is a functional block diagram of a remote assistance device according to a modification to the first embodiment.

In the first embodiment, a determination as to whether the point is within the extent of influence and a determination as to whether the sensor features and the registered features match, or the like, are made on the remote assistance device 110 side. In one modification, these processes may be performed on the AD vehicle 30 side. FIG. 17 illustrates a functional block diagram of the remote assistance device 110A in the modification, and FIG. 18 illustrates a functional block diagram of the on-board device 130A in the modification. Detailed description will be omitted for the elements similar to those in each of the remote assistance device 110 and the on-board devices 130 of the first embodiment.

As illustrated in FIG. 17, the remote assistance device 110A includes a vehicle state monitoring unit 112A, a remote assistance performing unit 116A, and a point information registration unit 118. The vehicle state monitoring unit 112A searches the point information DB 122 for point information indicating a point in the vicinity of the location of the on-board device 130A (any one of the AD vehicles 30) based on the vehicle information acquired from the on-board device 130A, and transmits the point information to the on-board device 130A. The vehicle state monitoring unit 112A may transmit all pieces of point information whose indicated points are within a predefined distance from the AD vehicle 30 or, in a case where the planned travel route is acquired from the AD vehicle 30, all pieces of point information whose indicated points are on the planned travel route. The remote assistance performing unit 116A is responsible for a process related to remote assistance by the operator 50 among the functions of the remote assistance performing unit 116 of the first embodiment.

As illustrated in FIG. 18, the on-board device 130A includes the vehicle information acquisition unit 132, the surroundings monitoring unit 134, a transceiver unit 136A, an assistance method determination unit 114A, an assistance performing unit 117A, the driving control unit 138, and a point information DB 122A. The transceiver unit 136A receives point information from the remote assistance device 110A and updates the contents of the point information DB 122A based on the received point information.

Based on the point information stored in the point information DB 122A, the assistance method determination unit 114A determines whether a remote assistance request has occurred within the extent of influence included in the point information, as in the assistance method determination unit 114 of the first embodiment. Upon determining that a remote assistance request has occurred within the extent of influence, the assistance method determination unit 114A determines to perform remote assistance based on the point information and forwards the point information to the assistance performing unit 117A. Upon determining that a remote assistance request has not occurred within the extent of influence, the assistance method determination unit 114A determines to perform remote assistance by the operator 50 and instructs the remote assistance device 110A to request the operator 50 via the transceiver unit 136A.

The assistance performing unit 117A determines a content of the action to be taken by the AD vehicle 30 and forwards it to the driving control unit 138 through a process similar to generation of remote-control information based on point information, which is a function of the remote assistance performing unit 116 in the first embodiment.

An example of each of the AD vehicle-side autonomous driving process and the remote assistance device-side autonomous driving process will now be described. Detailed description of similar process steps of each of the AD vehicle-side autonomous driving process and the remote assistance device-side autonomous driving process as in the first embodiment will be omitted. The remote assistance device 110A searches for point information whose indicated points are in the vicinity of the AD vehicle 30 based on the vehicle information received from the on-board device 130A and transmits it to the on-board device 130A. The on-board device 130A updates the contents of the point information DB 122A based on the point information received from the remote assistance device 110A.

Figure 19:
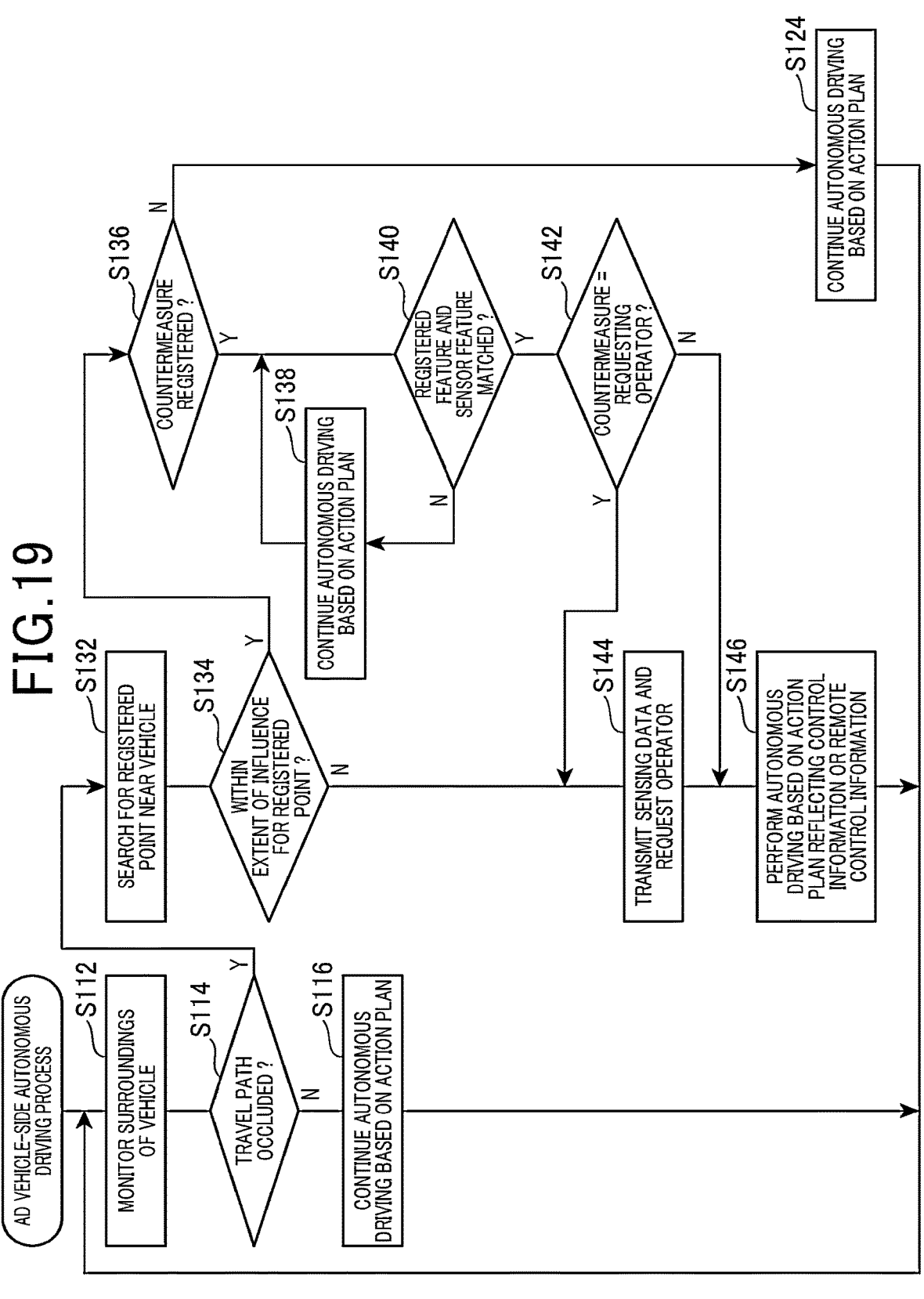
FIG. 19 is a flowchart of an example autonomous driving process on the AD vehicle side according to a modification to the first embodiment.

In parallel with the above process, the AD vehicle-side autonomous driving process illustrated in FIG. 19 is performed in the on-board 130A. An example of the autonomous driving vehicle-side autonomous driving process according to the modification will now be described with reference to FIG. 19. Since steps S112 to S116 are similar to those of the AD vehicle-side autonomous driving process as in the first embodiment, autonomous driving based on the action plan is continued if the travel path is not occluded.

If at step S114, the surroundings monitoring unit 134 determines that the travel path is occluded, the process flow proceeds to step S132. At step S132, the assistance method determination unit 114A searches the location information DB 122A for point information with a "location" whose distance from the location of the AD vehicle 30 indicated by the location information included in the vehicle information is within a pre-predefined distance.

At step S134, the assistance method determination unit 114A determines whether a remote assistance request has occurred within the extent of influence for a registered point based on the "extent of influence (distance)" and "extent of influence (duration)" included in the retrieved point information. If the answer is "YES", then the process flow proceeds to step S136. If the answer is "NO", then the process flow proceeds to step S144. If no point information for a registered point in the vicinity of the AD vehicle 30 is retrieved from the point information DB 122 at step S132, the process flow also proceeds to step S168.

At step S136, the assistance performing unit 117A determines whether a countermeasure is registered in the point information retrieved at step S132. If the answer is "YES", then the process flow proceeds to step S140. If the answer is "NO", then the process flow proceeds to step S124.

At step S140, the assistance performing unit 117A acquires the sensing data acquired by the surroundings monitoring unit 134 and determines whether sensor features extracted from the sensing data match registered features included in the point information retrieved at step S132. If the answer is "YES", then the process flow proceeds to step S142. If the answer is "NO", then the process flow proceeds to step S138.

At step S138, making a behavior change is temporarily withheld, the driving control unit 138 continues autonomous driving based on the predefined action plan, and the process flow returns to step S140. At step S142, the assistance performing unit 117A determines whether the countermeasure included in the point information is to request the operator 50 or to make a behavior change automatically. If the countermeasure is to request the operator 50, the process flow proceeds to step S144. If the countermeasure is to make a behavior change automatically, the process flow proceeds to step S146.

At step S144, the transceiver unit 136A transmits the sensing data acquired by the surroundings monitoring unit 134 to the remote assistance unit 110A and also transmits a remote assistance request to the remote assistance unit 110A to request the operator 50 to perform remote assistance. If the process flow proceeds from step S142 to step S146, the assistance performing unit 117A, at step S146, generates control information based on the content of the behavior change indicated by the countermeasure included in the point information. Subsequently, the driving control unit 138 performs autonomous driving control based on the action plan reflecting the control information, and the process flow returns to step S112. If the process flow proceeds from step S144 to step S146, the driving control unit 138, at step S146, performs autonomous driving control based on the action plan reflecting the remote-control information received from the remote assistance device 110A, and the processing flow returns to step S112.

Figure 20:
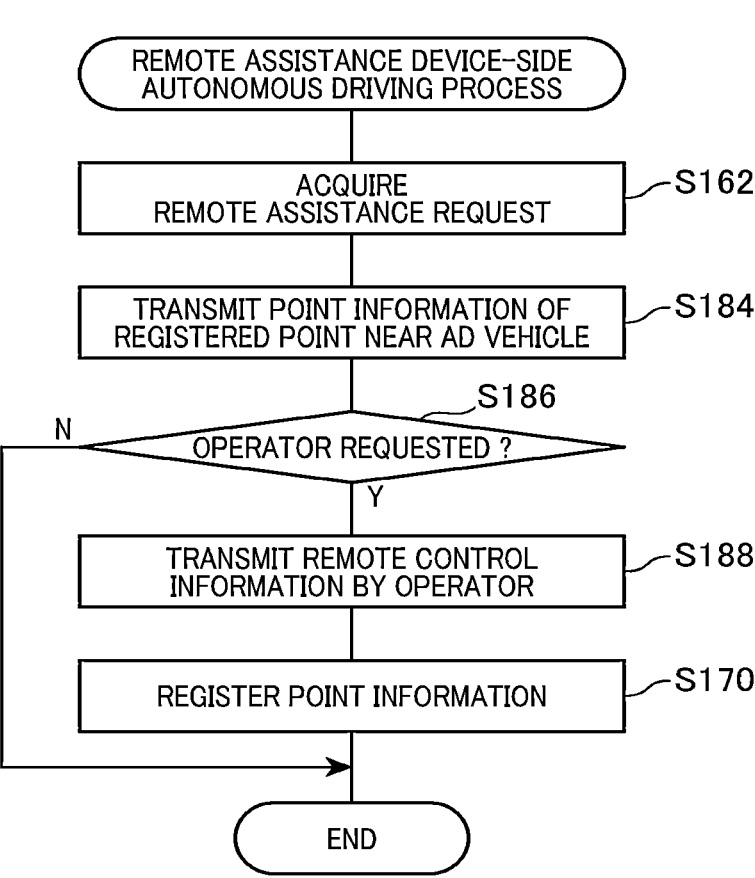
FIG. 20 is a flowchart of an example autonomous driving process on the remote assistance device side according to a modification to the first embodiment.

An example of the remote assistance device-side autonomous driving process will now be described with reference to FIG. 20.

At step S162, the vehicle state monitoring unit 112A acquires the vehicle information transmitted from the on-board device 130A. If the AD vehicle 30 is requesting remote assistance, the remote assistance request is acquired along with the vehicle information. Subsequently, at step S184, the vehicle state monitoring unit 112A searches the location information acquisition unit DB 122 for point information with a "location" whose distance from the location of the AD vehicle 30 indicated by the location information included in the acquired vehicle information is within a predefined range. That is, point information for registered points in the vicinity of the AD vehicle 30 is retrieved. The vehicle state monitoring unit 112A transmits the retrieved point information to the on-board device 130A. Repeating steps S162 and S184 allows the remote assistance device 110A to transmit point information with a "location" in the vicinity of the AD vehicle 30 to the on-board device 130A in advance.

Subsequently, at step S186, the remote assistance performing unit 116A determines whether an instruction for requesting the operator 50 has been received from the on-board device 130A. If the answer is "YES", then the process flow proceeds to step S188. If the answer is "NO", that is, if no remote assistance request has been received, then the remote assistance device-side autonomous driving process is ended. This is because it may be possible for the on-board device 130A to make a behavior change based on the transmitted point information.

At step S188, the remote assistance performing unit 116A requests the operator 50, performs remote assistance by the operator 50, and transmits remote-control information to the on-board device 130A. Then, at step S170, the point information registration unit 118 registers point information to the point information DB 122 in the case where the point information has not been registered and remote assistance by operator 50 is performed, and the remote assistance device-side autonomous driving process ended.

As described above, in the modification to the first embodiment, as in the first embodiment, this can suppress occurrence of unnecessary requests for operators and inappropriate remote assistance.

Second Embodiment

A second embodiment will now be described. The same elements as in the autonomous driving system 100 according to the first embodiment are assigned the same reference numbers and duplicated description thereof will be omitted. The hardware configuration of the remote assistance device and the on-board devices according to the second embodiment is the same as that of the remote assistance device 110 and the on-board devices 130 according to the first embodiment, illustrated in FIGS. 4 and 5, and therefore, duplicated description thereof will be omitted.

As illustrated in FIG. 3, the autonomous driving system 200 according to the second embodiment includes the remote assistance device 210, on-board devices 130 mounted to respective AD vehicles 30, and operator terminals 150 operated by respective operators 50.

Functional blocks of the remote assistance device 210 of the second embodiment will now be described with reference to FIG. 6. As illustrated in FIG. 6, the remote assistance device 210 includes the vehicle state monitoring unit 112, the assistance method determination unit 114, the remote assistance performing unit 116, and the point information registration unit 118. Each functional block is implemented by the CPU 12 illustrated in FIG. 4.

The remote assistance performing unit 216 performs remote assistance determined based on point information or remote assistance by the operator 50, as in the remote assistance performing unit 116 of the first embodiment. In addition, the remote assistance performing unit 216 determines whether the AD vehicle 30 is in need of new remote assistance while remote assistance is withheld, that is, the AD vehicle 30 is instructed to continue autonomous driving based on a predefined action plan. If new remote assistance is needed, the remote assistance performing unit 216 will perform remote assistance by the operator 50.

Figure 21:
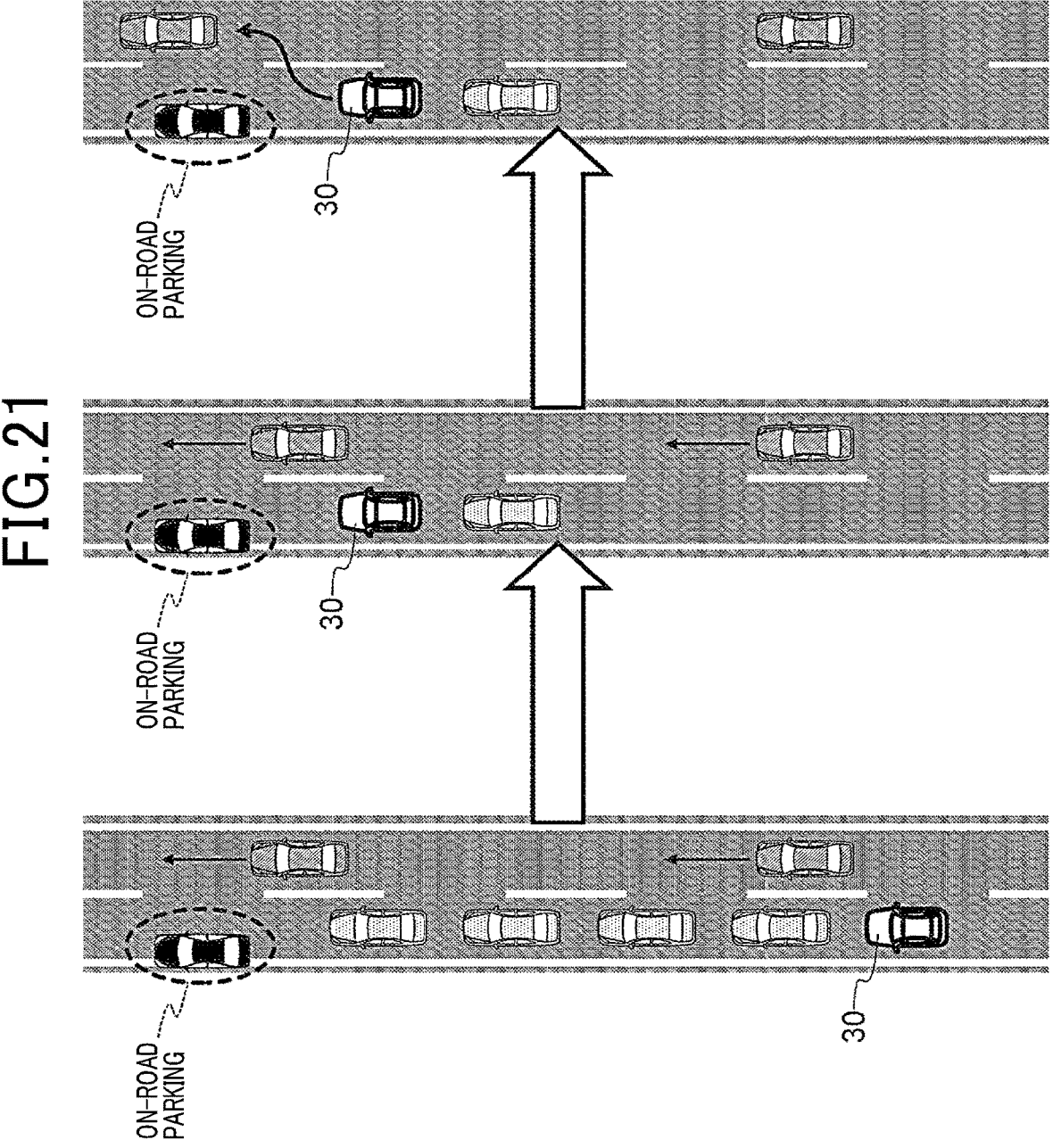
FIG. 21 is an illustration of a situation where new remote assistance is needed.

For example, as illustrated in the left portion of FIG. 21, it is assumed that a remote assistance request is generated upon the AD vehicle 30 being caught in a traffic jam caused by on-road parking. In this example, it is also assumed that the location information that caused on-road parking is not registered in the point information DB 122, or that the location of the AD vehicle 30 at the time the remote assistance request occurred is outside the extent of influence of the registered point information. In this case, the operator 50 is requested to perform remote assistance, and new point information is registered in the point information DB 122. In this case, the operator 50 is requested to perform remote assistance, and new point information is registered in the point information DB 122. At this time, since the operator 50 may fail to recognize the presence of on-road parking, which is the original cause, from surroundings of the AD vehicle 30, the AD vehicle 30 is instructed to continue autonomous driving based on the action plan and the point information is registered with traffic congestion as the cause.

Then, the preceding vehicles overtake the vehicle parked on the road, and the AD vehicle 30 thus gradually moves forward until it approaches close to the vehicle parked on the road, as illustrated in the center portion of FIG. 21. However, the AD vehicle 30 is stuck because it has been instructed to continue autonomous driving based on the action plan. In the second embodiment, in such a situation, it is determined that new remote assistance is needed and further remote assistance is to be performed.

Specifically, the remote assistance performing unit 216 determines whether the AD vehicle 30 needs new remote assistance within the extent of influence based on at least one of the state of the AD vehicle 30 indicated by the vehicle information stored in the vehicle information DB 120 and the sensing data acquired from the on-board device 130. If the AD vehicle 30 remains stationary for a predefined period of time or longer, the remote assistance performing unit 216 determines that the AD vehicle 30 cannot continue autonomous driving based on the action plan, that is, that new remote assistance is needed. In addition, the remote assistance performing unit 216 sequentially acquires sensing data and determines whether the dissimilarity between the feature quantities based on the acquired sensing data and the feature quantities based on the previously acquired sensing data is greater than or equal to a predefined value. If the dissimilarity between the feature quantities based on the acquired sensing data and the feature quantities based on the previously acquired sensing data exceeds the predefined value, the preceding vehicle overtakes the vehicle parked on the road and the obstacle ahead of the AD vehicle 30 thus changes from the preceding vehicle to the vehicle parked on the road, which indicates a drastic change in the sensing data. In this case, the remote assistance performing unit 216 may also determine that new remote assistance is needed.

If the remote assistance performing unit 216 determines that new remote assistance is needed, for example, as illustrated in the right portion of FIG. 21, the remote assistance performing unit 216 generates remote control control information indicating a travel trajectory (indicated by the solid arrow in the right portion of FIG. 21) for overtaking the vehicle parked on the road through the operation of the operator 50.

The point information registration unit 218 updates the registered point information when new remote assistance is determined to be necessary by the remote assistance performing unit 216 and remote assistance is performed by the operator 50. Specifically, the point information registration unit 218 updates the registered point information based on the location of the AD vehicle 30 for which remote assistance was first requested within the extent of influence, the location of the AD vehicle 30 when remote assistance was performed, and the content of the remote assistance that was performed.

For example, in the example illustrated in FIG. 21, point information is registered at the stage illustrated in the left portion of FIG. 21, where the "CAUSE" is traffic congestion, the "LOCATION" is the location of the AD vehicle 30 when the remote assistance request first occurred, the "EXTENT OF INFLUENCE" is the value of the extent of influence according to the traffic congestion, and the "COUNTERMEASURE" is "NONE". The point information registration unit 218 updates the "CAUSE" of this point information to on-road parking, the "LOCATION" to the location of the vehicle parked on the road, the "EXTENT OF INFLUENCE" the location of the AD vehicle 30 when the first remote assistance request occurred relative to the location of the point, and the "COUNTERMEASURE" to the behavior change (overtaking).

Figure 22:
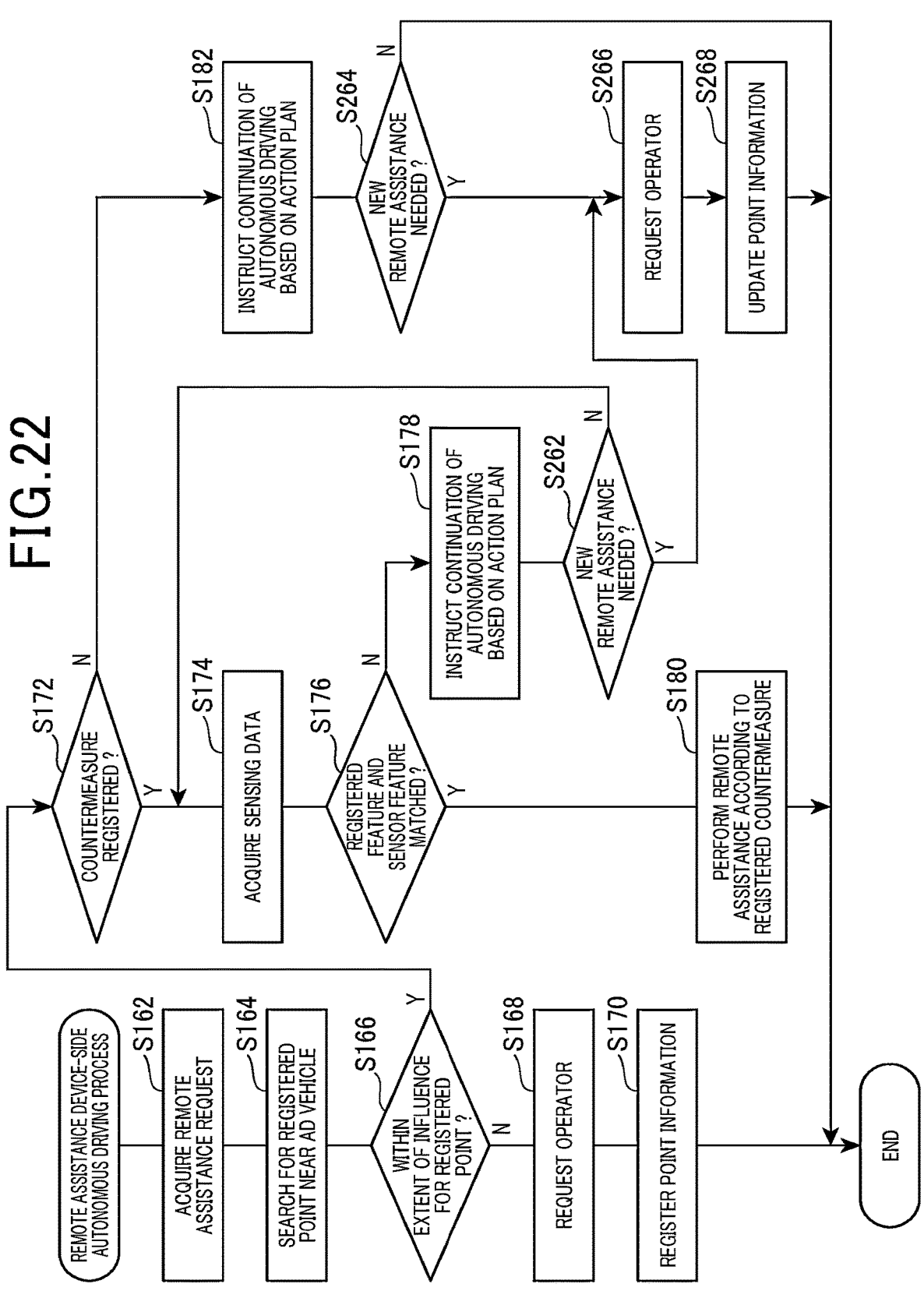
FIG. 22 is a flowchart of an example autonomous driving process on the remote assistance device side according to a second embodiment.

The operations of the autonomous driving system 200 according to the second embodiment will now be described. In the second embodiment, the remote assistance device 210 performs the remote assistance device-side autonomous driving process illustrated in FIG. 22. In the remote assistance device-side autonomous driving process according to the second embodiment, the same process steps as in the remote assistance device-side autonomous driving process according to the first embodiment (FIG. 16) are assigned the same reference numbers and duplicated description thereof will be omitted.

Continuation of autonomous driving based on the predefined action plan is instructed at step S178 in response the registered features not matching the sensor features. Then, the process flow proceeds to step S262. At step S262, the remote assistance performing unit 216 determines whether new remote assistance is needed by referring to at least one of the vehicle information DB 120 and the sensing data. If new remote assistance is needed, the process flow proceeds to step S266. If not, the process flow returns to step S174.

Continuation of autonomous driving based on the predefined action plan is instructed at step S182 in response to no countermeasure being registered in the point information. Then, the processing flow proceeds to step S264. At step S264, as in step S262, the remote assistance performing unit 216 determines whether new remote assistance is needed. If new remote assistance is needed, the process flow proceeds to step S266. If not, the remote assistance device-side autonomous driving process is ended.

At step S266, the remote assistance performing unit 216 requests the operator 50 to perform remote assistance. Subsequently, at step S268, the point information registration unit 218 updates the registered point information based on the location of the AD vehicle 30 for which remote assistance was first requested within the extent of influence, the location of the AD vehicle 30 when remote assistance was performed, and the content of the remote assistance that was performed. The remote assistance device-side autonomous driving process is ended.

As described above, in the autonomous driving system according to the second embodiment, it is determined weather new remote assistance is needed, when continuation of autonomous driving based on a predefined action plan is instructed. When new remote assistance is needed, remote assistance is performed by the operator and the point information is updated based on the remote assistance that was performed. This allows for correction of any misjudgement that may have occurred in the initial point information registration.

Modification to Second Embodiment

In a modification to the second embodiment, as in the modification to the first embodiment, some of the functions of the assistance method determination unit 114 and the remote assistance performing unit 216 of the remote assistance device 210 may be provided on the on-board device side.

In this modification, in the AD vehicle-side autonomous driving process illustrated in FIG. 19, after step S138, it is determined in the on-board device whether new remote assistance is needed based on at least one of the acquired vehicle information and sensing data. If new remote assistance is needed, the process flow may proceed to step S144. If not, the process flow may return to step S140. Similarly, after step S124, the on-board device may determine whether new remote assistance is needed. If new remote assistance is needed, the process flow may proceed to step S144, and if not, the process flow may return to step S112.

Each of the AD vehicle-side autonomous driving process and the remote assistance device-side autonomous driving process executed by the CPU executing the software (computer programs) in each of the above-described embodiments may be executed by various processors other than the CPU. Examples of such processors may include a programmable logic device (PLD) whose circuit configuration can be changed after the manufacture of a field-programmable gate array (FPGA) or the like, and a dedicated electric circuit which is a processor having a circuit configuration specifically designed for executing specific processing such as an application specific integrated circuit (ASIC) or the like. In addition, the autonomous driving process may also be executed by a single processor or by a combination of two or more processors of the same type or of different types (for example, a plurality of FPGAs and combinations of CPUs and FPGAs). Further, specifically, the electric circuit obtained by combining circuit elements, such as semiconductor elements, can be used as the hardware structure of these various processors.

In addition, in each of the above embodiments, a mode in which the program is stored (installed) in a storage unit in advance has been described, but the present disclosure is not limited to this. The program may be provided in a form stored in a non-transitory tangible storage medium such as a CD-ROM, a DVD-ROM, a Blu-ray Disc, and a USB memory. Furthermore, the program may be downloaded from an external apparatus via a network.

While the present disclosure has been described with reference to the embodiments, it is understood that the present disclosure is not limited to such embodiments and structures. The present disclosure includes various modifications and modifications within the equivalent range. Additionally, various combinations and forms, as well as other combinations and forms including only one element, or more or less, are within the scope and spirit of the present disclosure.

What is claimed is:

1. An autonomous driving method for causing a computer to perform processes of:

registering, for each point where remote assistance has been performed in the past for an autonomous driving vehicle of a plurality of autonomous driving vehicles, point information indicating a location of the point, at least an extent of influence defined by a distance from the location of the point, and a countermeasure for a remote assistance request, the countermeasure for the remote assistance request including transmission of control information for instructing the autonomous driving vehicle to make a behavior change or request an operator intervention; and upon occurrence of a remote assistance request from another autonomous driving vehicle of the plurality of autonomous driving vehicles within the extent of influence included in the registered point information, temporarily withholding execution of remote assistance with content of the countermeasure included in the point information and causing the another autonomous driving vehicle to continue preset autonomous driving control, wherein the execution of remote assistance is temporarily withheld until the another autonomous driving vehicle reaches the point where the remote assistance should originally be performed.

2. The autonomous driving method according to claim 1, wherein the extent of influence is defined by a value predefined according to a cause of remote assistance, or statistical information on past traffic around the corresponding point.

3. The autonomous driving method according to claim 2, wherein the processes further comprise a process of correcting the extent of influence based on at least either of a time of day when remote assistance is performed and road characteristics at the corresponding point.

4. The autonomous driving method according to claim 1, wherein the extent of influence is defined not only by the distance, but also by a duration for which a cause of the remote assistance is occurring.

5. The autonomous driving method according to claim 4, wherein the processes further comprise a process of deleting the point information including the extent of influence after the duration specified by the extent of influence has elapsed.

6. The autonomous driving method according to claim 1, wherein the processes further comprise processes of:

registering, as the point information, feature quantities based on sensing data of surroundings of the corresponding point; and sequentially acquiring sensing data around the another autonomous driving vehicle for which execution of the remote assistance has been withheld, and performing the withheld remote assistance when a similarity between the feature quantities based on the acquired sensing data and the feature quantities registered for the corresponding point is greater or equal to a predefined value.

7. The autonomous driving method according to claim 6, wherein the feature quantities are feature quantities indicating an obstacle that occludes a travel path of the another autonomous driving vehicle based on predefined autonomous driving control.

8. The autonomous driving method according to claim 1, wherein the processes further comprise a process of:

performing new remote assistance when the another autonomous driving vehicle remains stationary for a predefined period of time or longer with execution of the remote assistance being withheld, or when sensing data of surroundings of the another autonomous driving vehicle is sequentially acquired and a dissimilarity between feature quantities based on the acquired sensing data and feature quantities based on previously acquired sensing data is greater than or equal to a predefined value.

9. The autonomous driving method according to claim 8, wherein the processes further comprise a process of:

upon performing the new remote assistance within the extent of influence, updating the registered point information based on a location where the remote assistance was first performed within the extent of influence, a location where the new remote assistance was performed, and a content of the new remote assistance that was performed.

10. The autonomous driving method according to claim 8, wherein the new remote assistance comprising requesting an operator intervention.

11. The autonomous driving method according to claim 1, wherein the processes further comprise a process of:

in a case where at least one of the plurality of autonomous driving vehicles has passed through a point having the point information registered without requesting remote assistance, deleting the registered point information.

12. An autonomous driving device comprising:

a registration unit configured to register, for each point where remote assistance has been performed in the past for an autonomous driving vehicle of a plurality of autonomous driving vehicles, point information indicating a location of the point, at least an extent of influence defined by a distance from the location of the point, and a countermeasure for a remote assistance request, the countermeasure for the remote assistance request including transmission of control information for instructing the autonomous driving vehicle to make a behavior change or request an operator intervention; and a performing unit configured to, upon occurrence of a remote assistance request from another autonomous driving vehicle of the plurality of autonomous driving vehicles within the extent of influence included in the registered point information, temporarily withhold execution of remote assistance with a content of the countermeasure included in the point information and cause the another autonomous driving vehicle to continue preset autonomous driving control, wherein the execution of remote assistance is temporarily withheld until the another autonomous driving vehicle reaches the point where the remote assistance should originally be performed.

13. A non-transitory computer-readable medium comprising instructions for causing a computer to:

register, for each point where remote assistance has been performed in the past for an autonomous driving vehicle of a plurality of autonomous driving vehicles, point information indicating a location of the point, at least an extent of influence defined by a distance from the location of the point, and a countermeasure for a remote assistance request, the countermeasure for the remote assistance request including transmission of control information for instructing the autonomous driving vehicle to make a behavior change or request an operator intervention; and

upon occurrence of the remote assistance request from another autonomous driving vehicle of the plurality of autonomous driving vehicles within the extent of influence included in the registered point information, temporarily withhold execution of remote assistance with a content according to the countermeasure included in the point information and cause the another autonomous driving vehicle to continue preset autonomous driving control, wherein the execution of remote assistance is temporarily withheld until the another autonomous driving vehicle reaches the point where the remote assistance should originally be performed.

14. An autonomous driving system comprising:

an on-board device to be mounted to each of a plurality of autonomous driving vehicles and configured to control autonomous driving of the corresponding autonomous driving vehicle of the plurality of autonomous driving vehicles; and a remote assistance device configured to perform remote assistance for autonomous driving of the plurality of autonomous driving vehicles, wherein the remote assistance device comprises a registration unit configured to register, for each point where remote assistance has been performed in the past for an autonomous driving vehicle of the plurality of autonomous driving vehicles, point information indicating a location of the point, at least an extent of influence defined by a distance from the location of the point, and a countermeasure for a remote assistance request, the countermeasure for the remote assistance request including transmission of control information for instructing the autonomous driving vehicle to make a behavior change or request an operator intervention, and the remote assistance device or the on-board device comprises a performing unit configured to, upon occurrence of the remote assistance request from another autonomous driving vehicle of the plurality of autonomous driving vehicles within the extent of influence included in the registered point information, temporarily withhold execution of remote assistance with a content according to the countermeasure included in the point information and cause the another autonomous driving vehicle to continue preset autonomous driving control, wherein the execution of remote assistance is temporarily withheld until the another autonomous driving vehicle reaches the point where the remote assistance should originally be performed.

* * * * *